(12) United States Patent
Chayon et al.

(10) Patent No.: US 9,367,982 B2
(45) Date of Patent: Jun. 14, 2016

(54) AUTOMATIC MOBILE COMMUNICATOR DEPOT SYSTEM AND METHODOLOGY

(71) Applicant: CELLOMAT ISRAEL LTD., Netanya (IL)

(72) Inventors: Itzik Chayon, Kfar Saba (IL); Rafi Brahami, Givatayim (IL); Hanan Samet, Emek Hefer (IL); Rafael Poran, Kochav Yair (IL); Meir Rabinovitch, Emek Hefer (IL); Roshel Borochov, Neve Yamin (IL); Ron Nabarro, Ra'anana (IL)

(73) Assignee: CELLOMAT ISRAEL LTD., Netanya (IL)

( * ) Notice: Subject to any disclaimer, the term of this patent is extended or adjusted under 35 U.S.C. 154(b) by 0 days.

(21) Appl. No.: 14/305,328

(22) Filed: Jun. 16, 2014

(65) Prior Publication Data

US 2014/0295819 A1 Oct. 2, 2014

Related U.S. Application Data

(63) Continuation-in-part of application No. 13/629,245, filed on Sep. 27, 2012, now Pat. No. 8,755,783.

(60) Provisional application No. 61/577,112, filed on Dec. 19, 2011.

(51) Int. Cl.
| | |
|---|---|
| *H04W 24/00* | (2009.01) |
| *G07F 11/00* | (2006.01) |
| *H04W 24/02* | (2009.01) |
| *G07F 17/40* | (2006.01) |
| *G07F 7/06* | (2006.01) |

(52) U.S. Cl.
CPC ............... *G07F 11/002* (2013.01); *G07F 7/06* (2013.01); *G07F 17/40* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 4,951,308 A | 8/1990 | Bishop et al. | |
| 7,392,046 B2 | 6/2008 | Leib et al. | |
| 7,640,458 B2 | 12/2009 | Rao et al. | |
| 7,881,965 B2 | 2/2011 | Bowles et al. | |
| 8,755,783 B2 * | 6/2014 | Brahami et al. | ............... 455/418 |
| 2003/0073411 A1 | 4/2003 | Meade, II | |

(Continued)

FOREIGN PATENT DOCUMENTS

| | | |
|---|---|---|
| WO | 0115096 | 3/2001 |
| WO | 2013093902 A1 | 6/2013 |

OTHER PUBLICATIONS

Communication dated Sep. 5, 2013, issued by the United States Patent and Trademark Office in counterpart U.S. Appl. No. 13/629,245.

(Continued)

*Primary Examiner* — Diane Mizrahi
(74) *Attorney, Agent, or Firm* — Sughrue Mion, PLLC

(57) ABSTRACT

A mobile telephone device distribution system including a customer interface allowing a customer to select a mobile telephone device and a telephone number to be associated with the mobile telephone device and a computerized mobile telephone dispenser operative to dispense a preselected mobile telephone having a customer preselected telephone number to the customer who earlier selected the mobile telephone device and the telephone number and automatically activate the mobile telephone device.

19 Claims, 28 Drawing Sheets

(56) References Cited

U.S. PATENT DOCUMENTS

| | | |
|---|---|---|
| 2003/0073412 A1 | 4/2003 | Meade, II |
| 2003/0073432 A1 | 4/2003 | Meade, II |
| 2005/0031206 A1 | 2/2005 | Kaneko et al. |
| 2008/0032789 A1 | 2/2008 | Walker et al. |
| 2008/0126261 A1 | 5/2008 | Lovett |
| 2009/0143103 A1 | 6/2009 | Chishti et al. |
| 2010/0228676 A1 | 9/2010 | Librizzi et al. |
| 2010/0235249 A1 | 9/2010 | Smith et al. |
| 2011/0047033 A1 | 2/2011 | Mahaffey et al. |
| 2012/0021820 A1 | 1/2012 | Gordon et al. |
| 2013/0016173 A1 | 1/2013 | Johnson et al. |
| 2013/0090996 A1 | 4/2013 | Stark |
| 2013/0124426 A1 | 5/2013 | Bowles et al. |
| 2013/0157641 A1* | 6/2013 | Brahami et al. .............. 455/418 |
| 2013/0246285 A1* | 9/2013 | Chayun et al. ............... 705/305 |
| 2013/0311318 A1 | 11/2013 | Librizzi et al. |
| 2014/0249668 A1* | 9/2014 | Brahami et al. .............. 700/233 |
| 2014/0346185 A1* | 11/2014 | Chayun et al. .................... 221/1 |

OTHER PUBLICATIONS

Communication dated Feb. 4, 2014, issued by the United States Patent and Trademark Office in counterpart U.S. Appl. No. 13/629,245.

International Preliminary Report on Patentability dated Jun. 24, 2014, issued by the International Burea of WIPO in counterpart International Application No. PCT/IL2012/000392.

International Search Report and Written Opinion dated May 28, 2013, issued by the International Searching Authority in counterpart International Application No. PCT/IL12/00392.

An Office Action dated Aug. 13, 2015, which issued during the prosecution of U.S. Appl. No. 14/367,108.

European Search Report dated Aug. 14, 2015, which issued during the prosecution of Applicant's European App No. 12858899.3.

An Office Action dated May 28, 2015, which issued during the prosecution of U.S. Appl. No. 14/277,908.

* cited by examiner

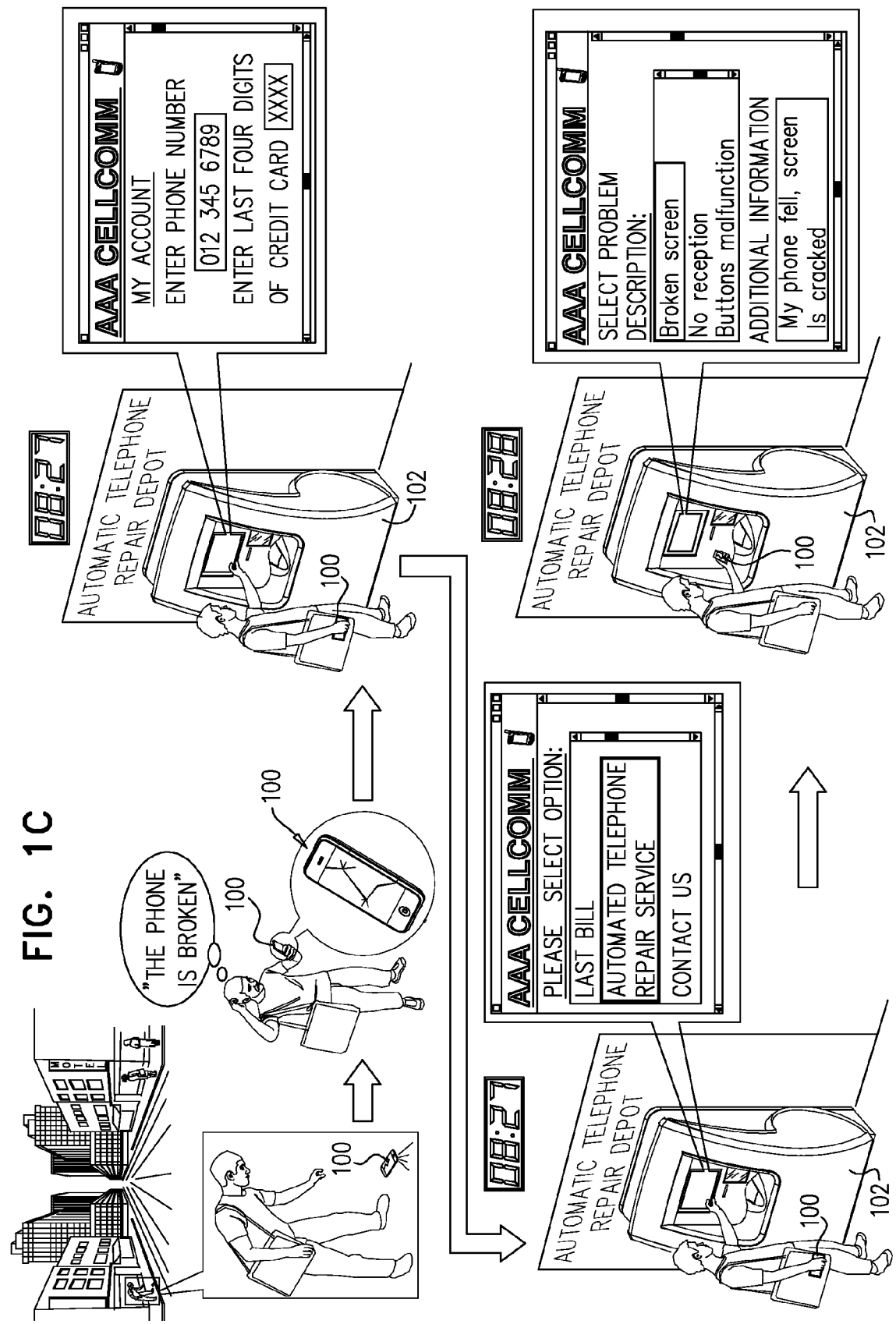

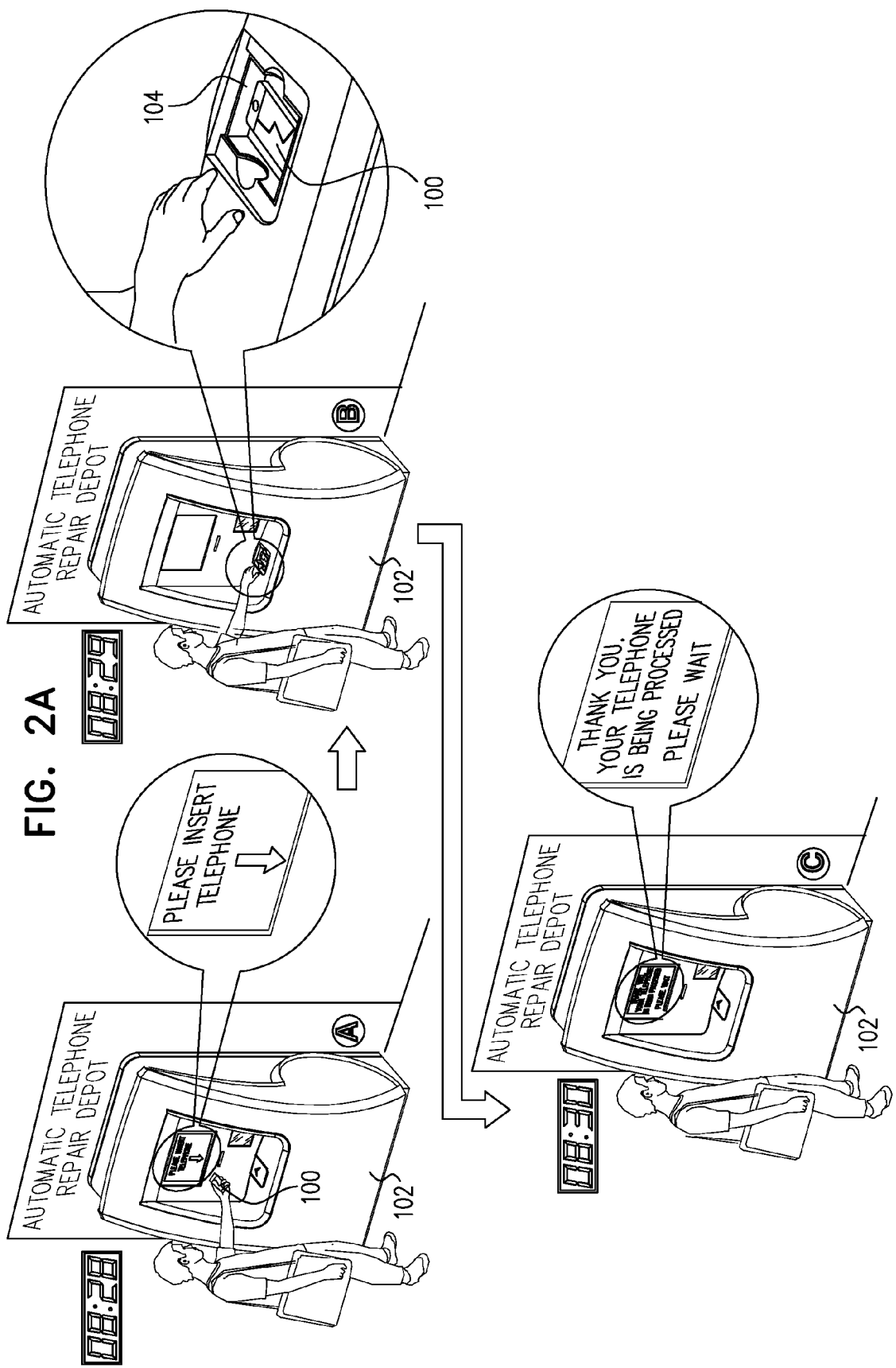

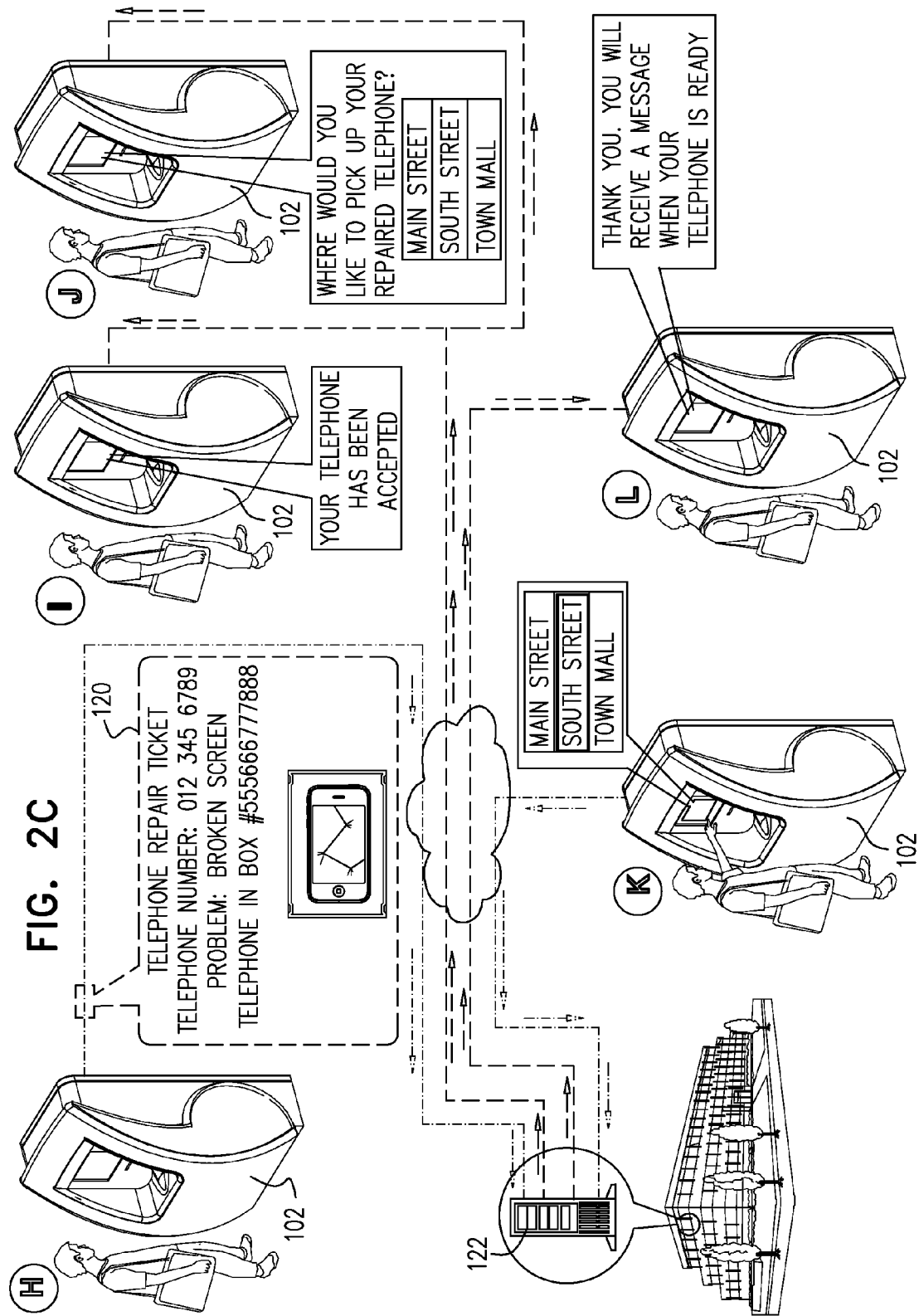

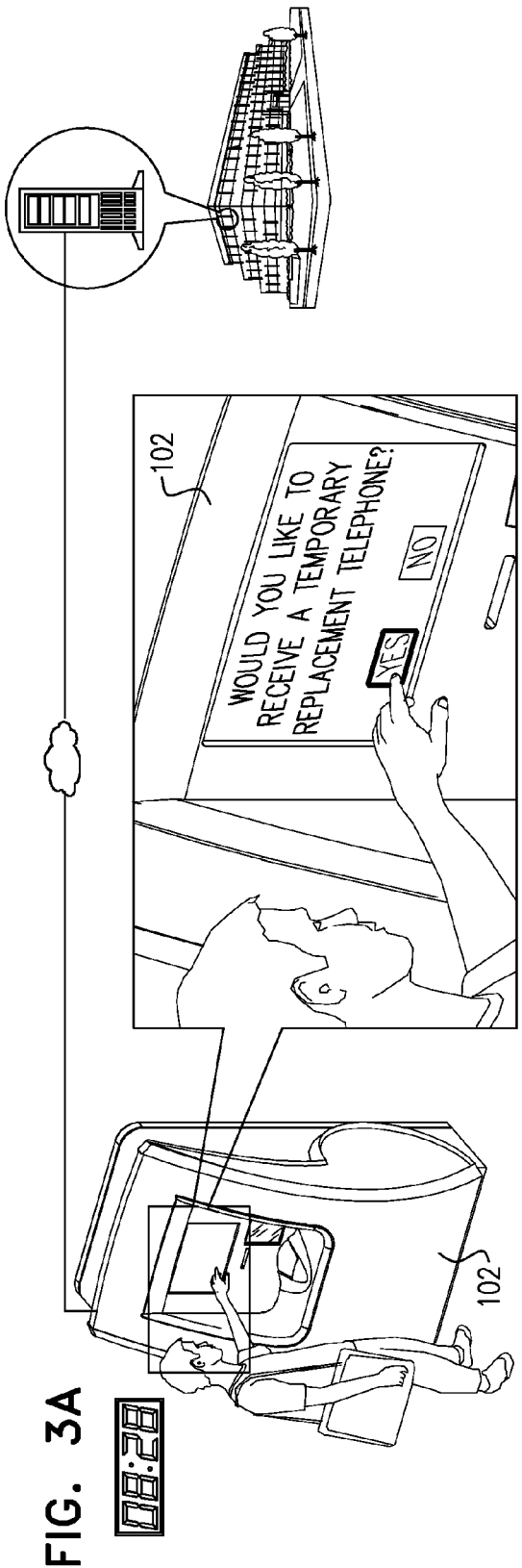
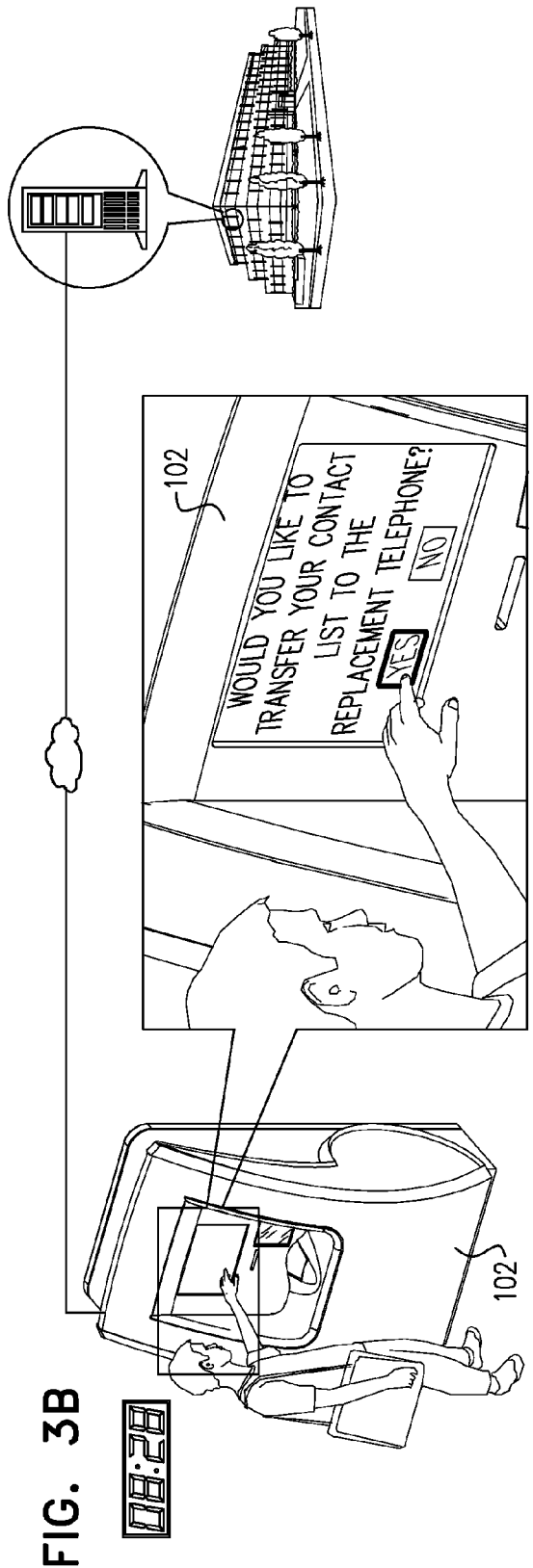

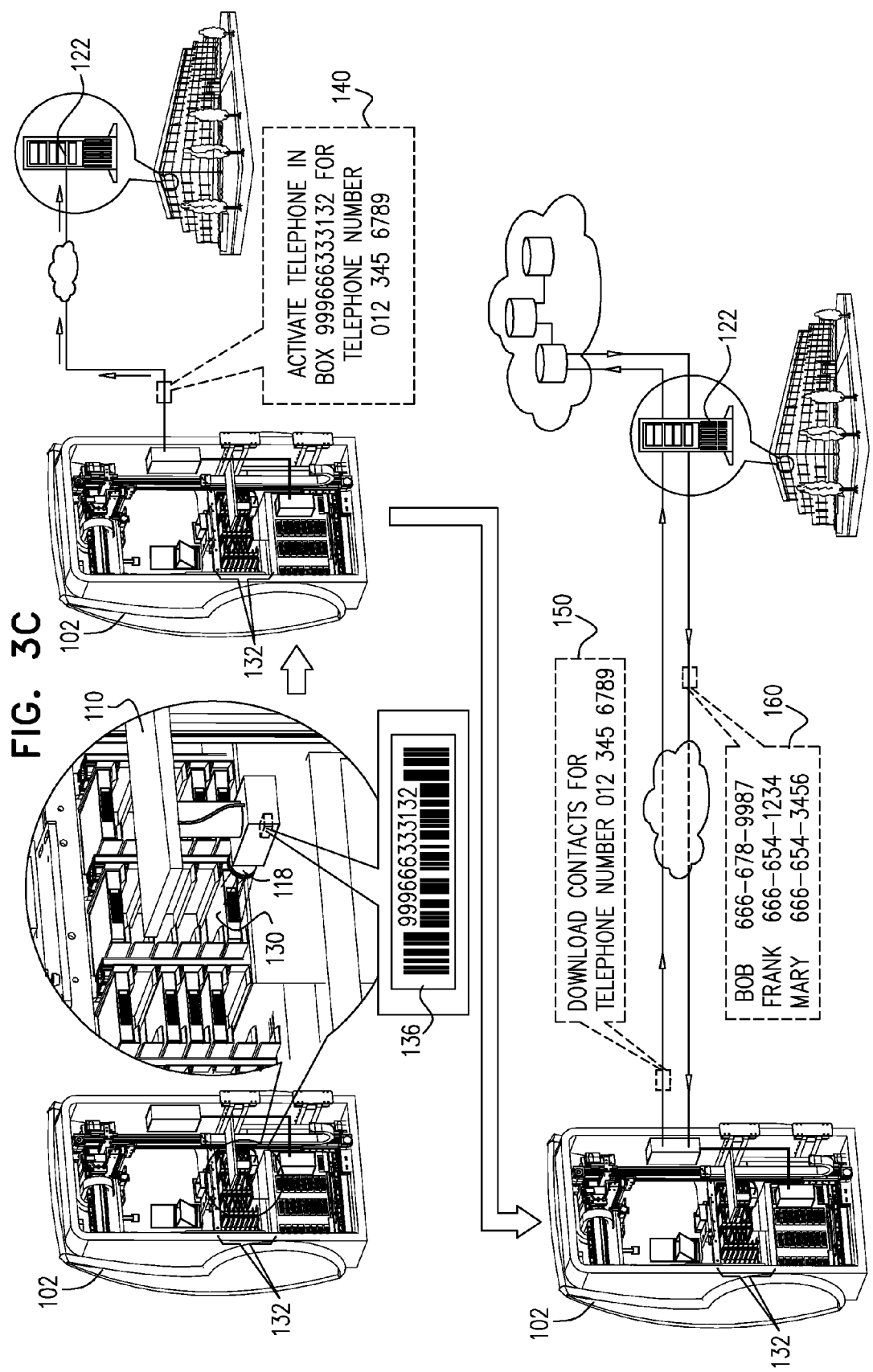

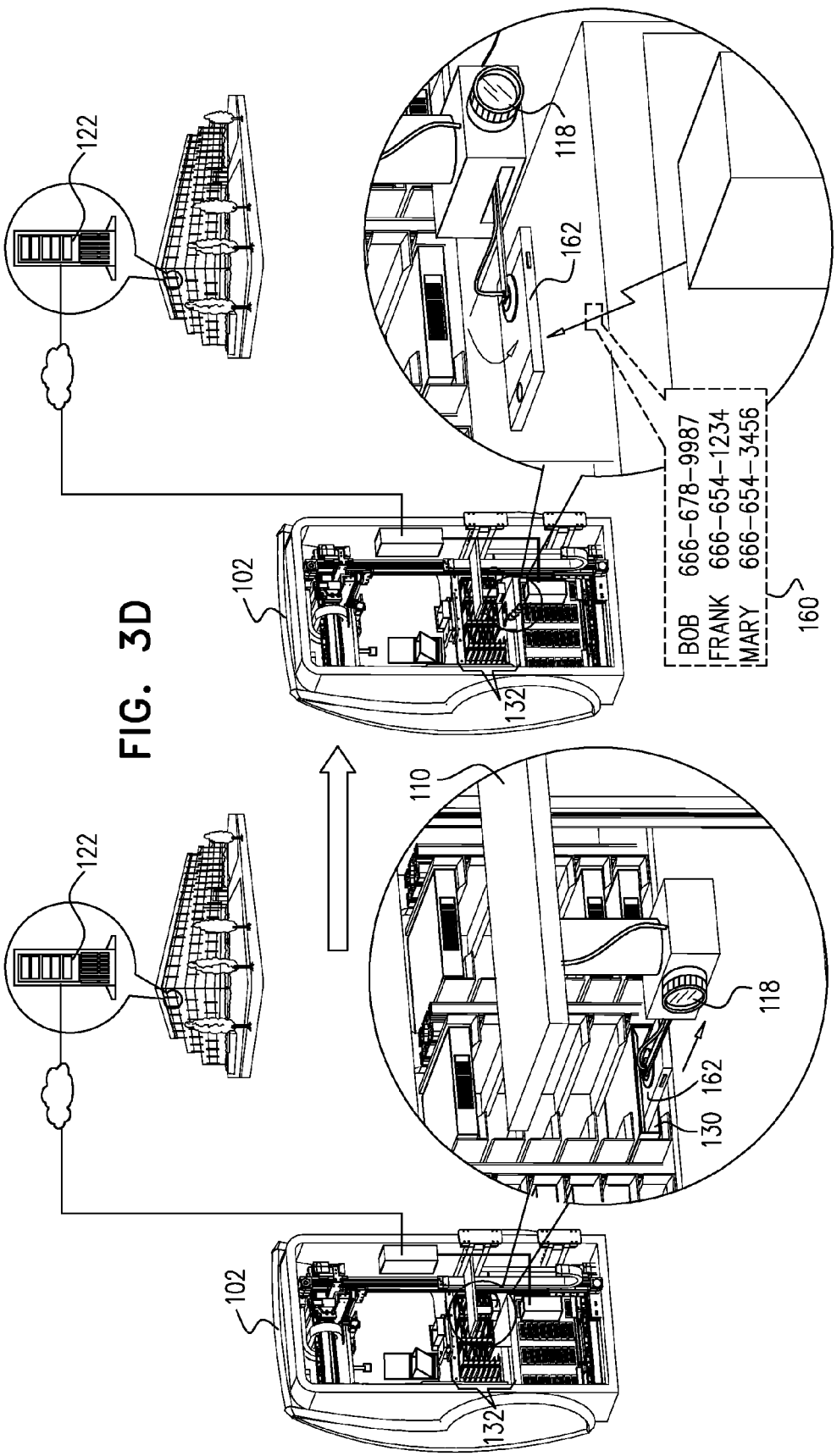

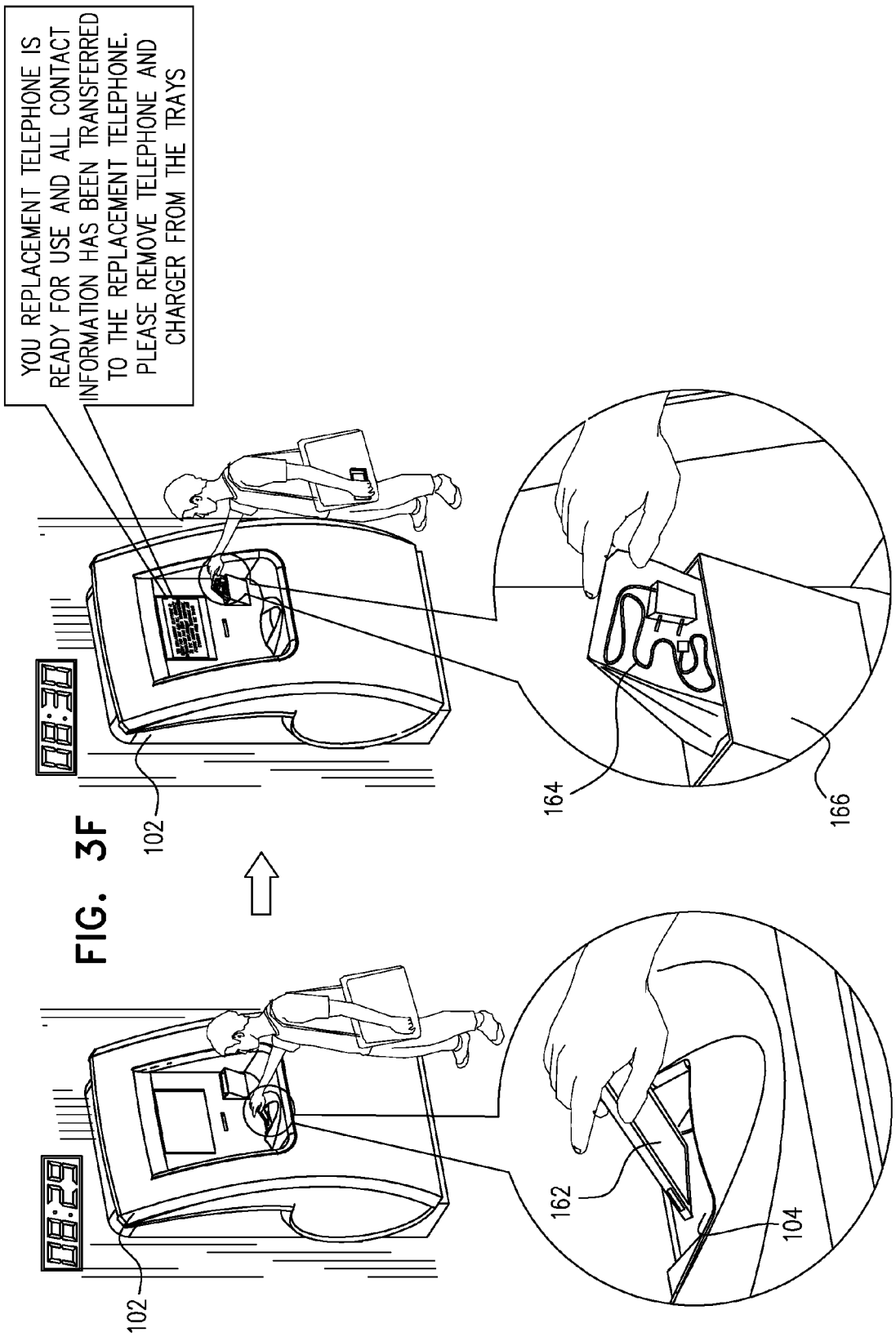

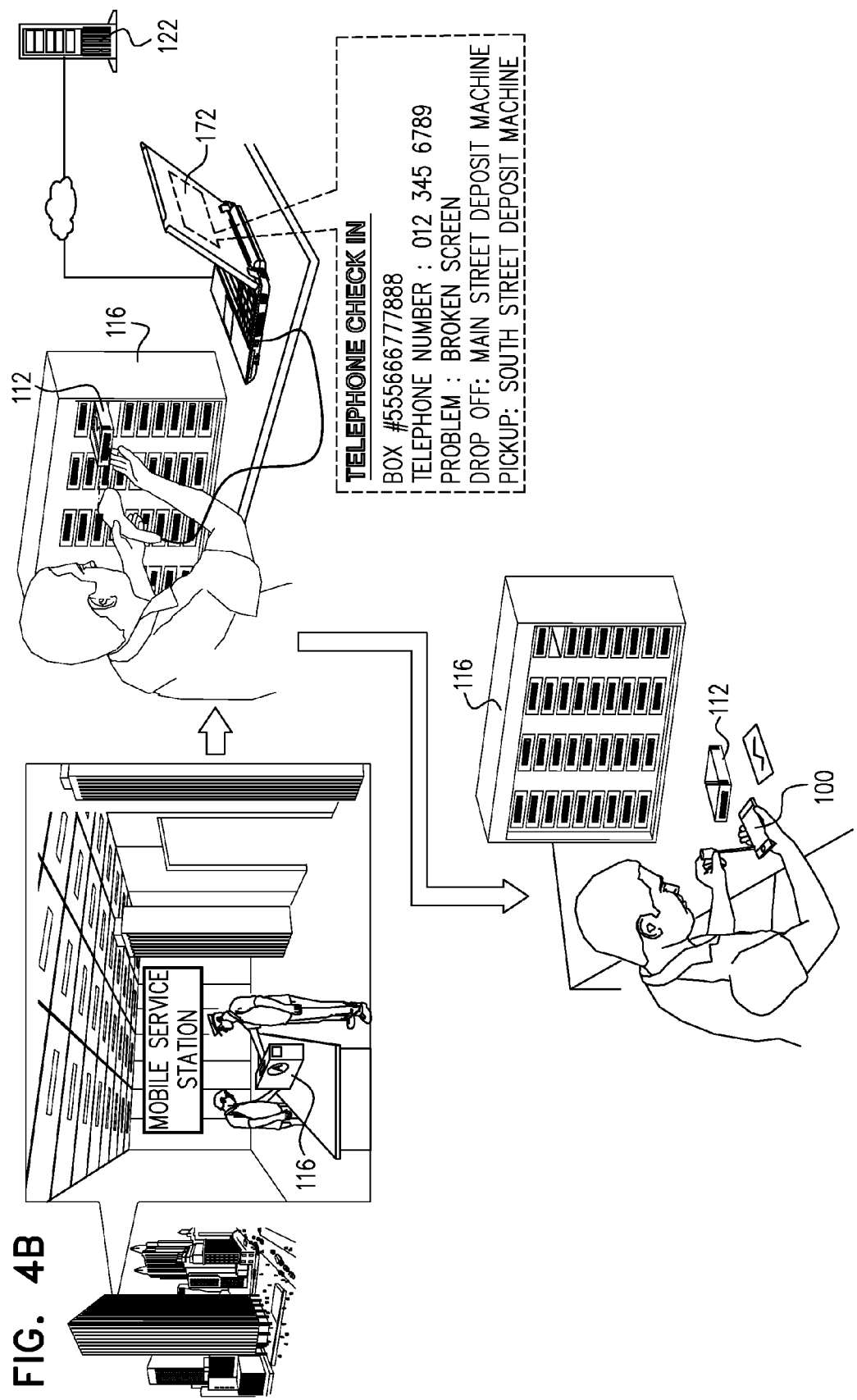

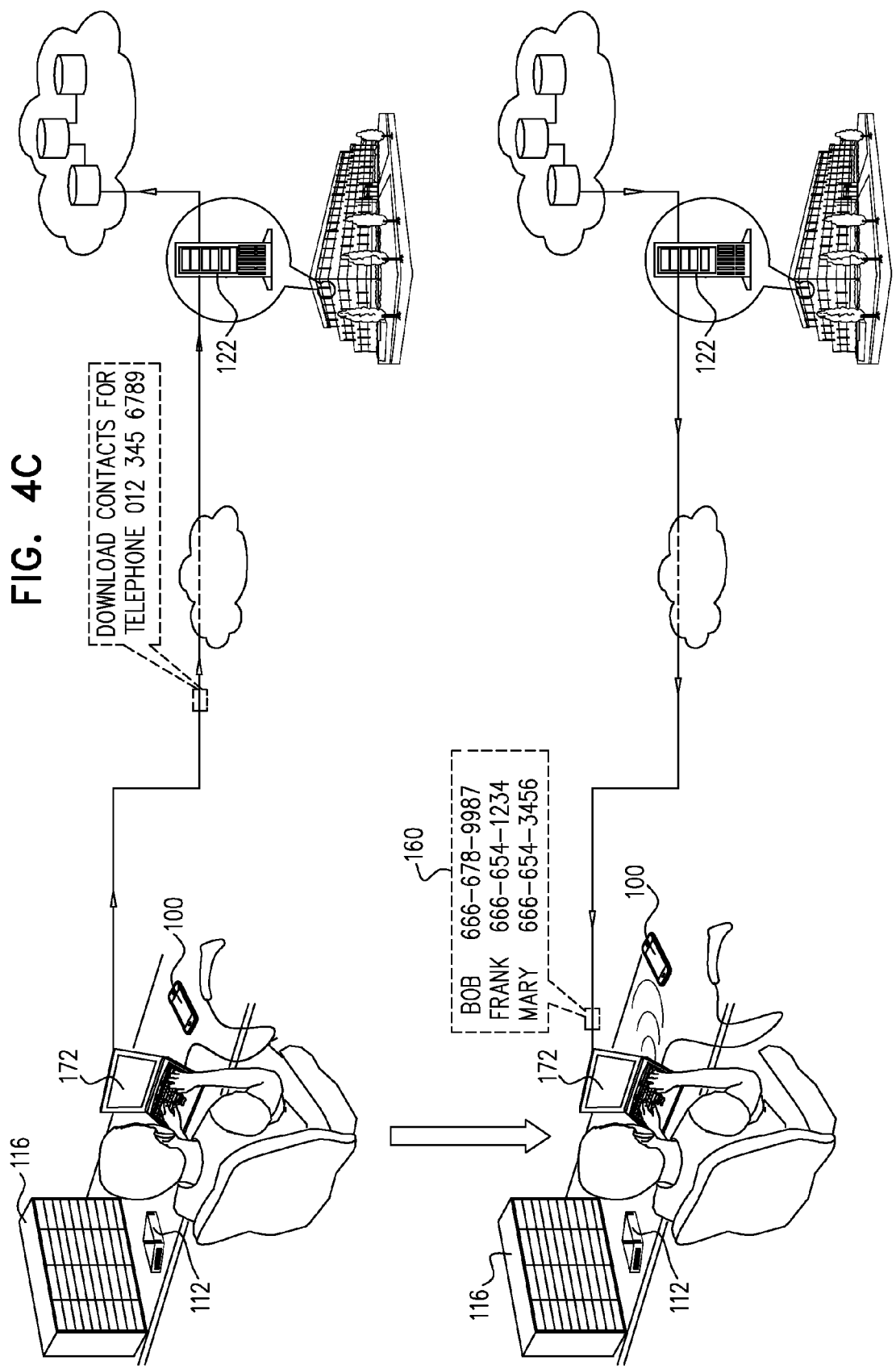

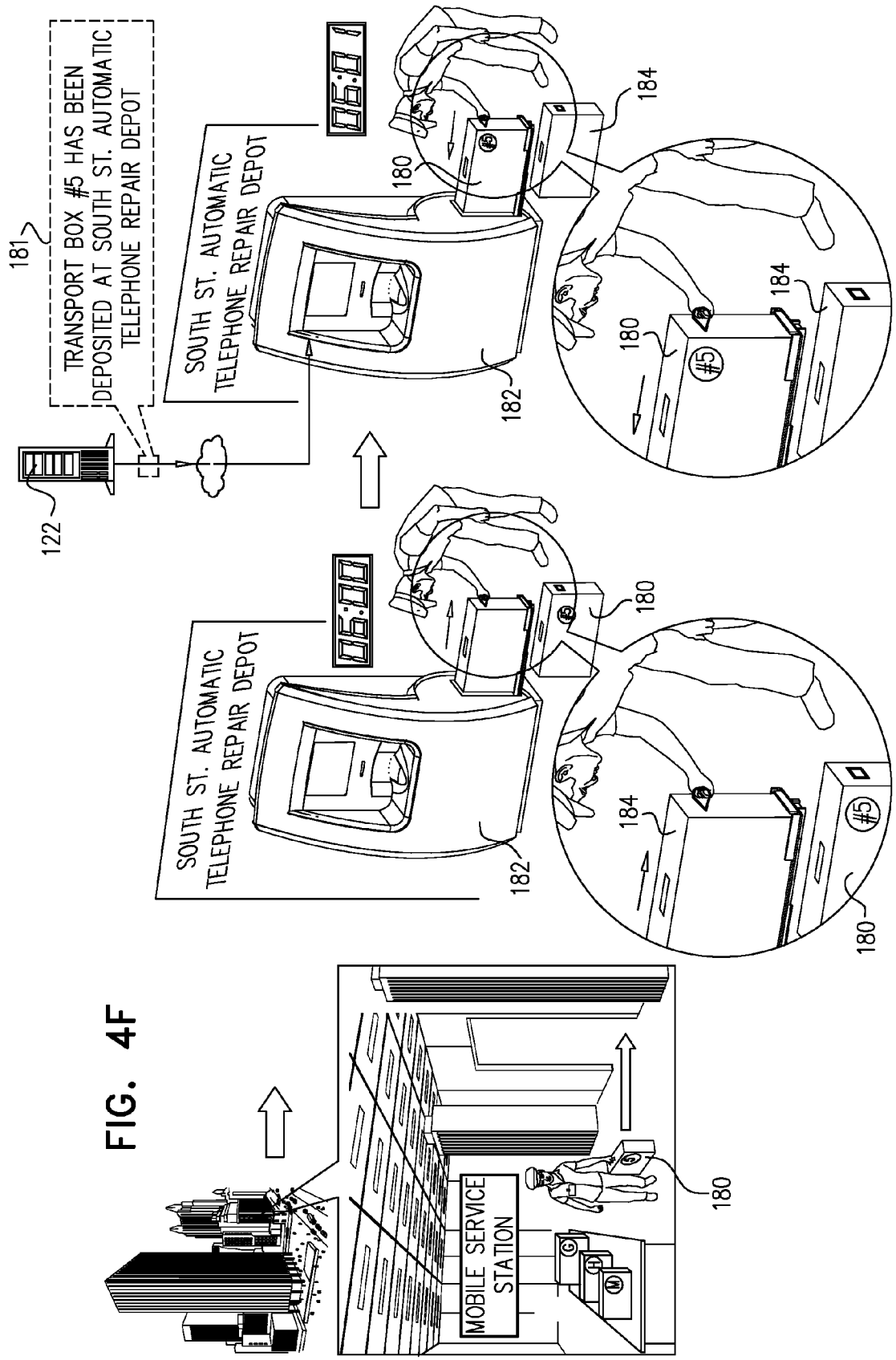

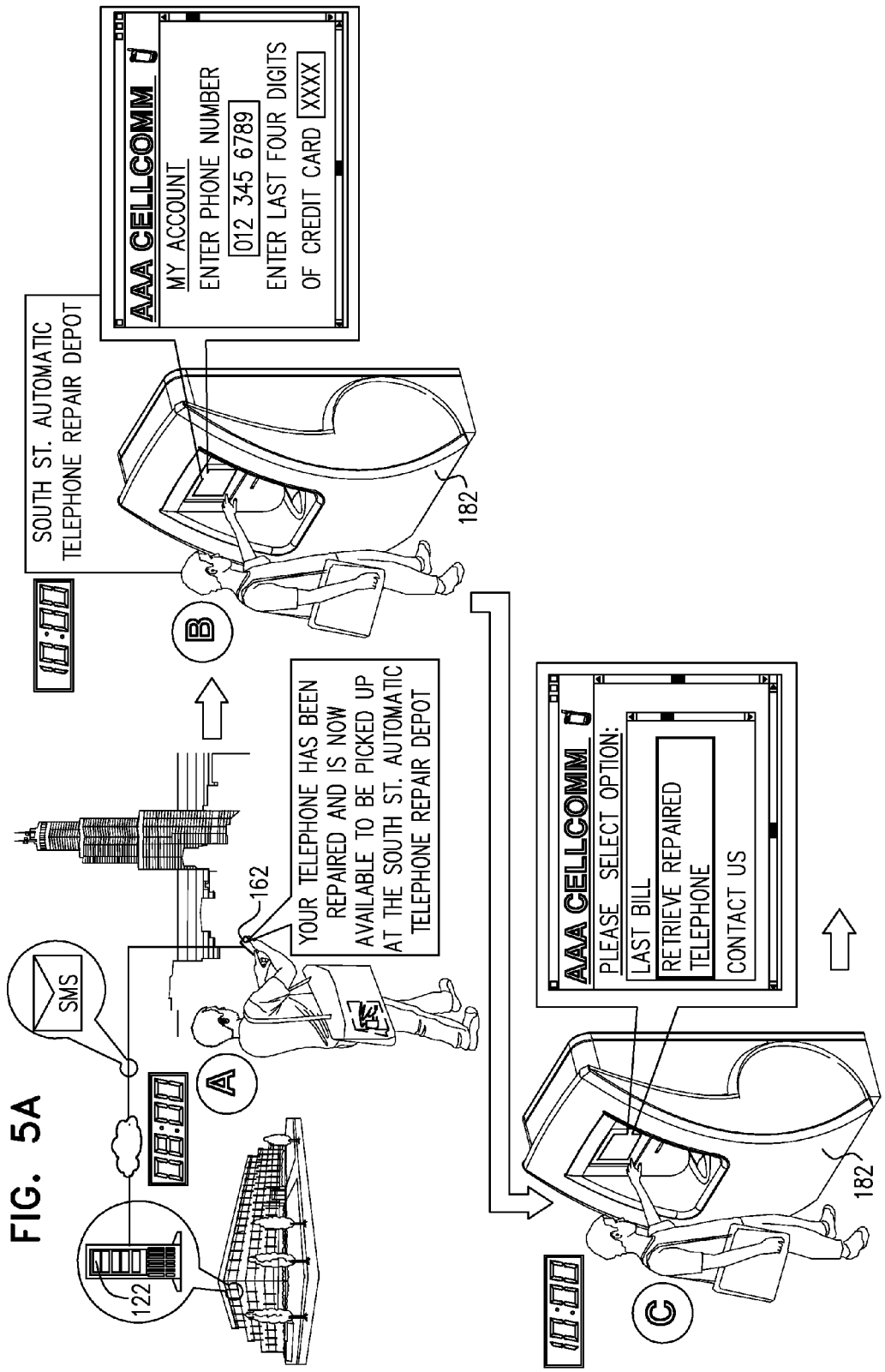

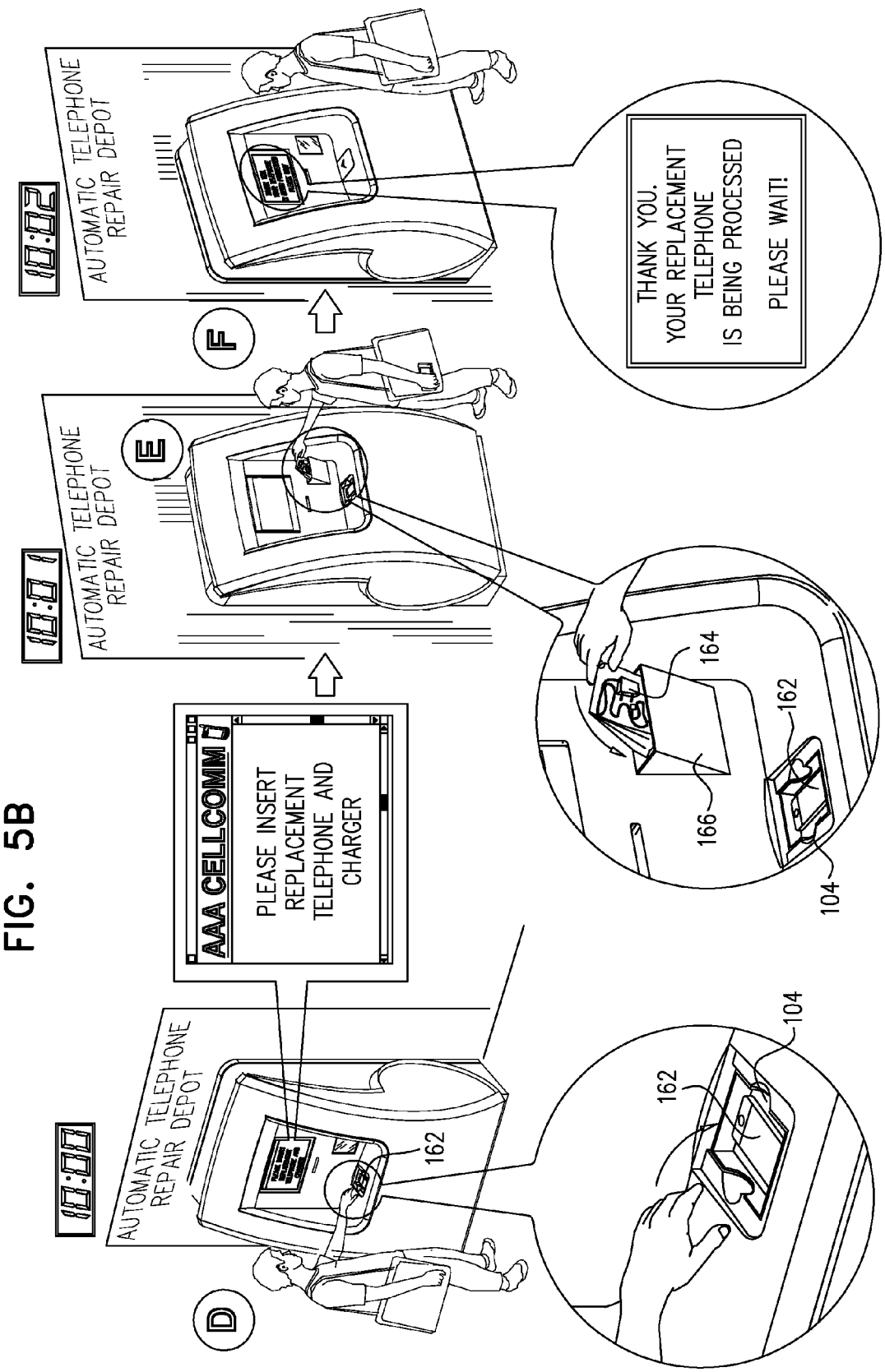

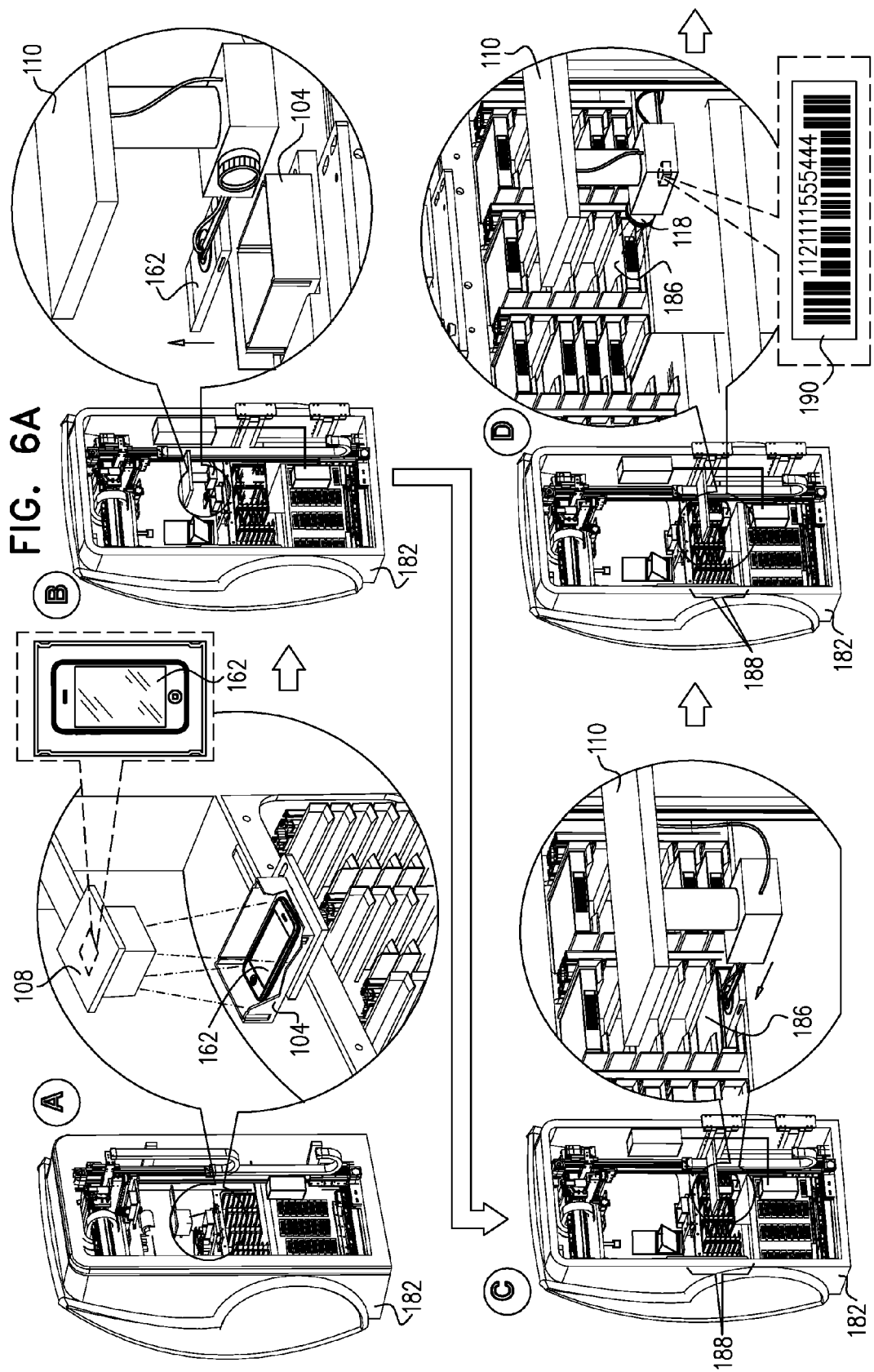

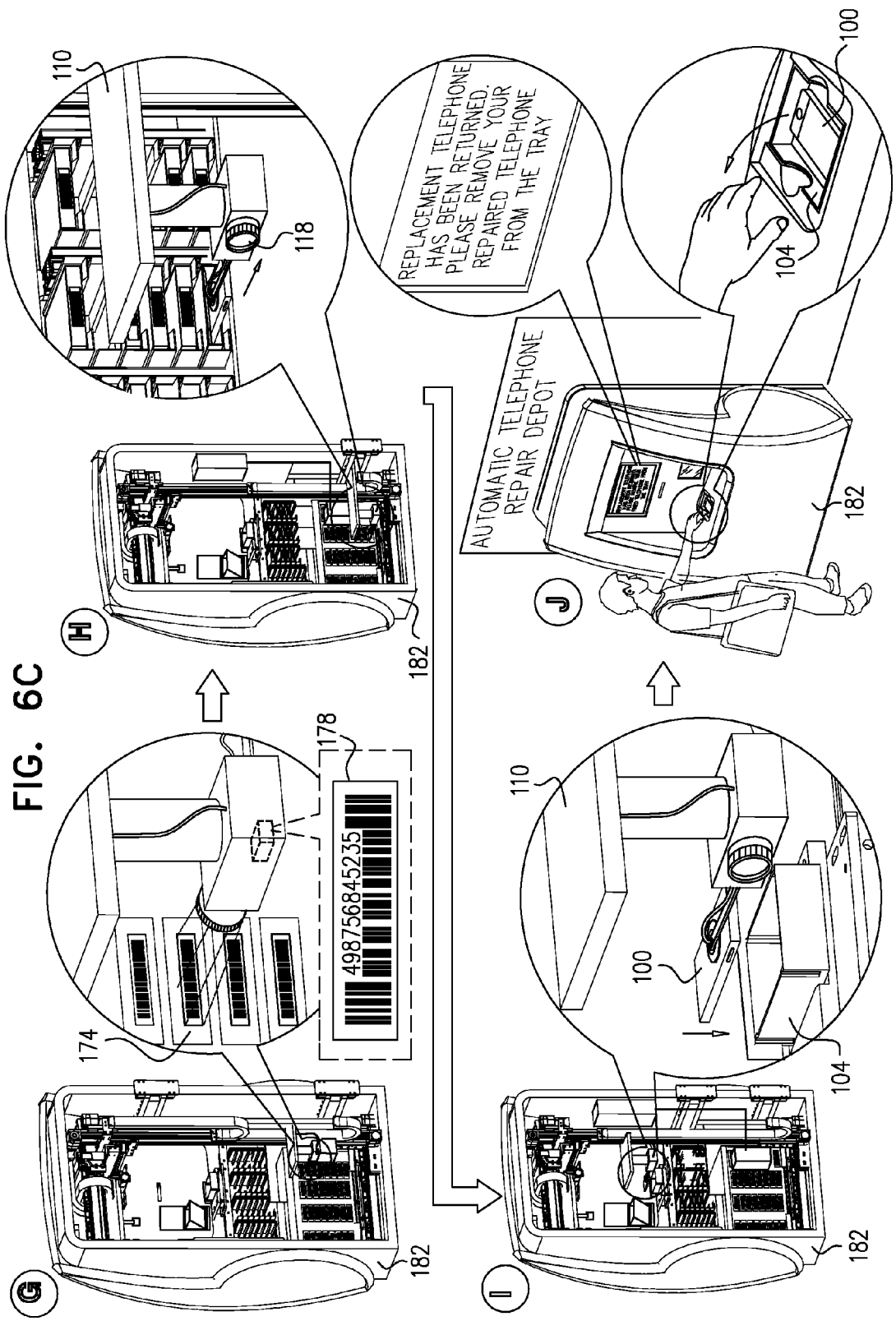

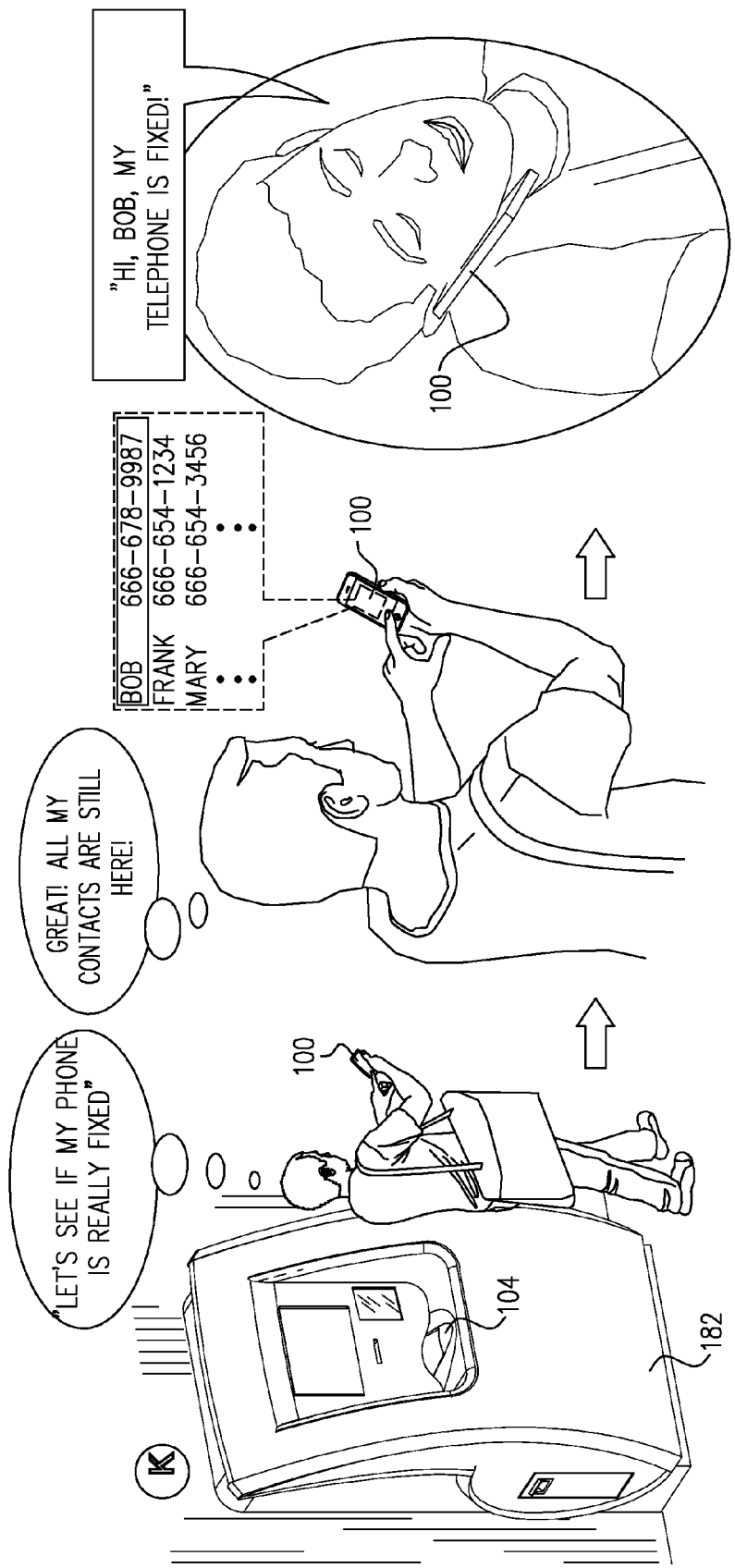

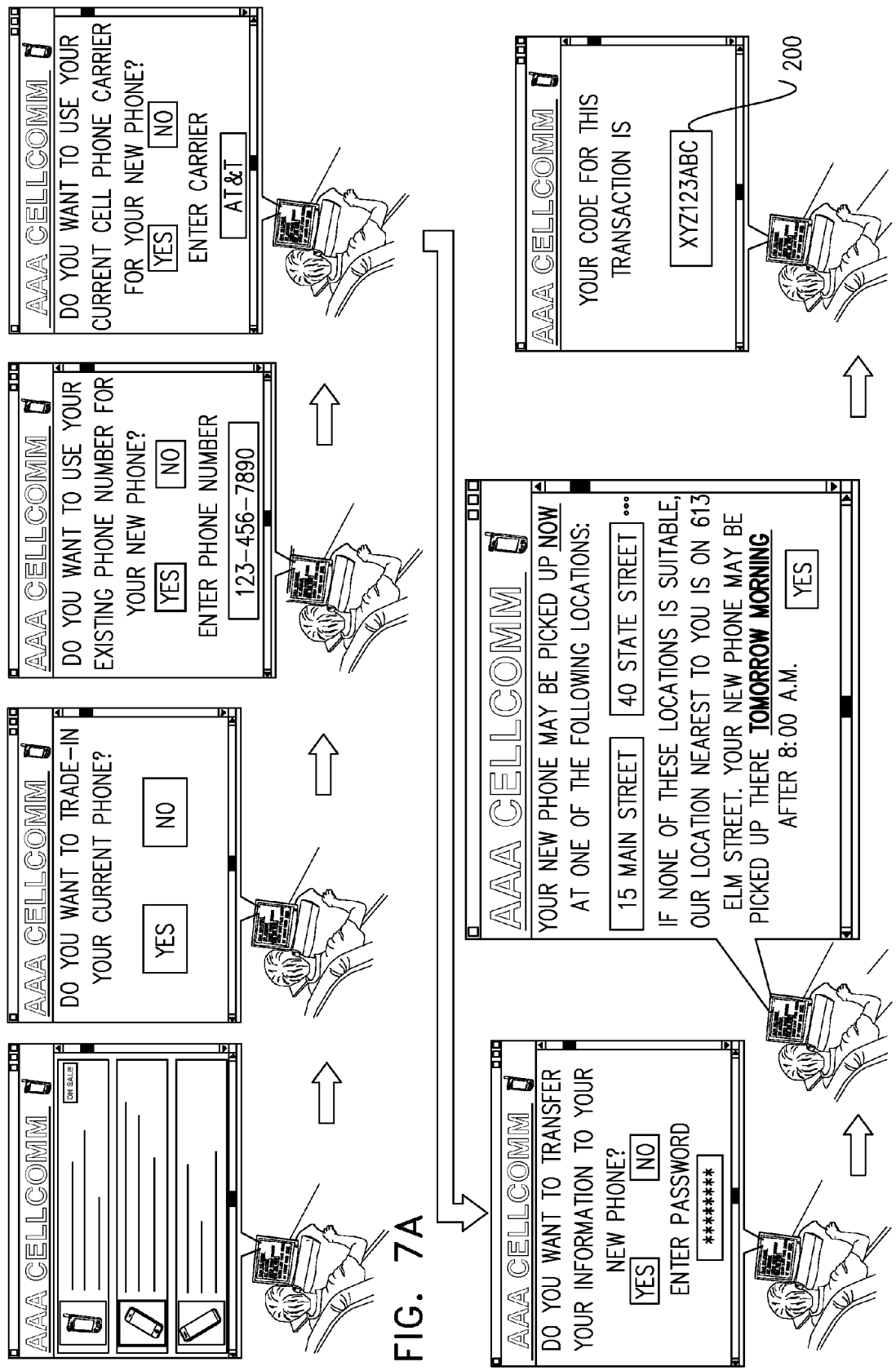

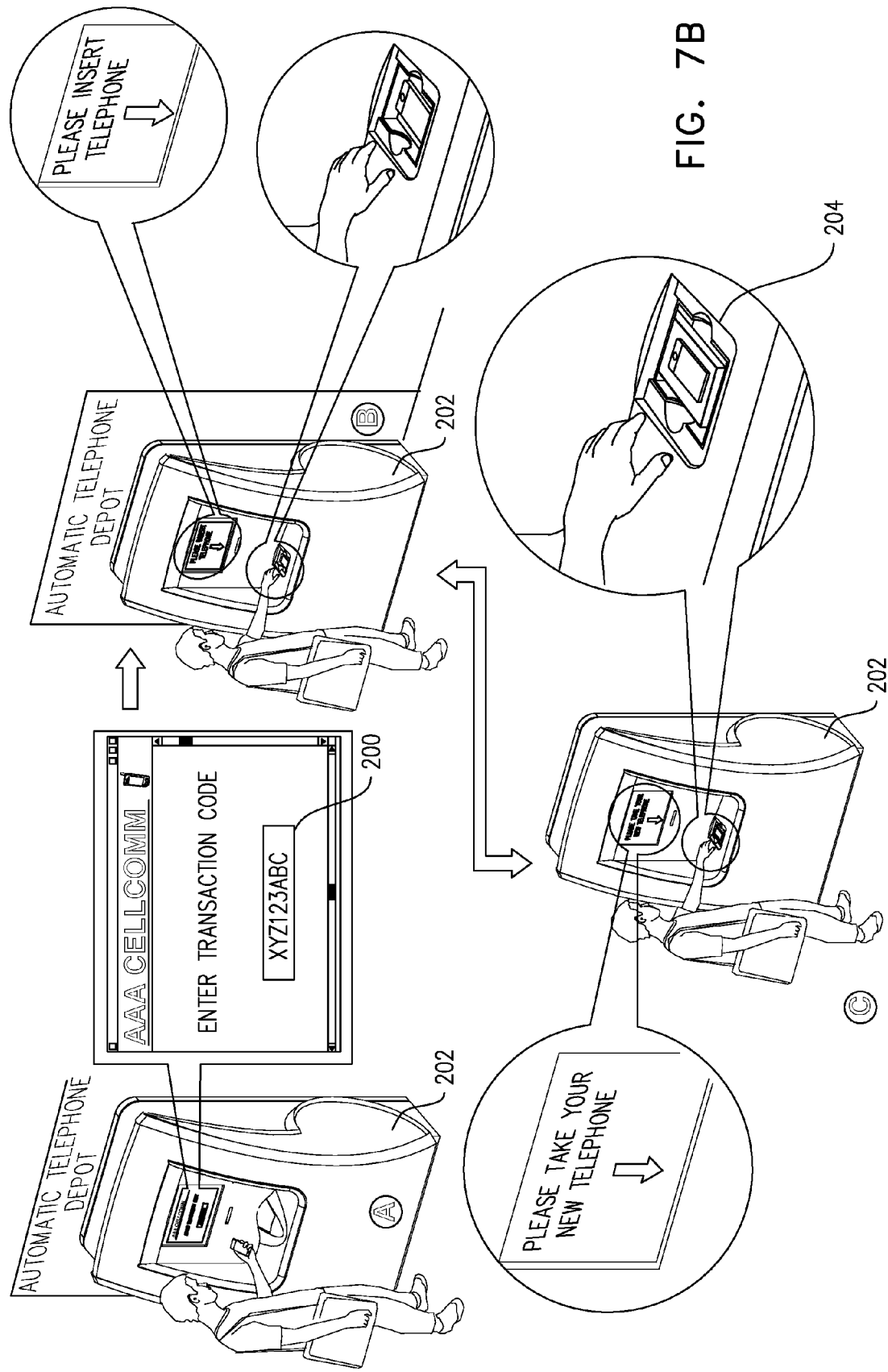

AUTOMATIC MOBILE COMMUNICATOR DEPOT SYSTEM AND METHODOLOGY

REFERENCE TO RELATED APPLICATIONS

This application is a continuation-in-part of U.S. patent application Ser. No. 13/629,245, entitled AUTOMATIC MOBILE COMMUNICATOR DEPOT SYSTEM AND METHODOLOGY, filed Sep. 27, 2012, which claims priority from U.S. Provisional Patent Application Ser. No. 61/577,112, entitled A RECEIVING MALFUNCTIONING MOBILE PHONE AND A DISPENSING FUNCTIONING CELLULAR TELEPHONE CONSOLE, filed Dec. 19, 2011, the disclosures of which are hereby incorporated by reference.

FIELD OF THE INVENTION

The present invention relates to mobile communicator distribution, repair and replacement logistics generally.

BACKGROUND OF THE INVENTION

In recent years, the demand for mobile communicators and the number of mobile communicators in the hands of the public has increased greatly, thus creating a need for efficient logistics for handling distribution, repair and replacement thereof.

SUMMARY OF THE INVENTION

The present invention seeks to provide an automatic mobile communicator depot system and methodology.

There is thus provided in accordance with a preferred embodiment of the present invention a mobile telephone device distribution system including a customer interface allowing a customer to select a mobile telephone device and a telephone number to be associated with the mobile telephone device and a computerized mobile telephone dispenser operative to dispense a preselected mobile telephone having a customer preselected telephone number to the customer who earlier selected the mobile telephone device and the telephone number and automatically activate the mobile telephone device.

Preferably, the mobile telephone device distribution system also includes a computerized mobile telephone service provider interface providing automated communication with at least one mobile telephone service provider. Additionally, the computerized web-based customer interface also allows the customer to select a mobile telephone service provider and the computerized mobile telephone service provider interface automatically assigns the customer preselected telephone number to the preselected mobile telephone.

In accordance with a preferred embodiment of the present invention the computerized mobile telephone dispenser also includes automatic data transfer functionality operable for transferring of data stored in a telephone device received by the computerized mobile telephone dispenser from the customer to the preselected mobile telephone dispensed by the mobile telephone dispenser to the customer. Additionally or alternatively, the computerized mobile telephone dispenser also includes automatic data transfer functionality operable for transferring of data of the customer, the data stored in an internet accessible storage facility, to the preselected mobile telephone dispensed by the mobile telephone dispenser to the customer.

Preferably, the computerized mobile telephone dispenser also includes a user data input device for providing data input to the dispenser.

In accordance with a preferred embodiment of the present invention the customer interface is a computerized web-based customer interface.

There is also provided in accordance with another preferred embodiment of the present invention a mobile telephone device distribution system including a customer interface allowing a customer to select a mobile telephone device, a telephone number to be associated with the mobile telephone device and a mobile telephone service provider and a computerized mobile telephone dispenser operative to dispense a preselected mobile telephone having a customer preselected telephone number to a customer who earlier selected the mobile telephone device and the telephone number and automatically activate the mobile telephone device using the customer preselected telephone number and the mobile telephone service provider.

Preferably, the mobile telephone device distribution system also includes a computerized mobile telephone service provider interface providing automated communication with at least one mobile telephone service provider. Additionally, the computerized mobile telephone service provider interface automatically assigns the customer preselected telephone number to the preselected mobile telephone and automatically assigns the customer preselected telephone number and the customer preselected mobile telephone to the mobile telephone service provider.

In accordance with a preferred embodiment of the present invention the computerized mobile telephone dispenser is operative to wirelessly communicate with the mobile telephone device for automatically activating the mobile telephone device using the customer preselected telephone number and the mobile telephone service provider. Additionally, the mobile telephone device is associated with a SIM which can communicate with a selected one of multiple mobile telephone service providers. Alternatively, the mobile telephone device has built in SIM functionality which enables it to communicate with a selected one of multiple mobile telephone service providers.

In accordance with a preferred embodiment of the present invention the computerized mobile telephone dispenser also includes automatic data transfer functionality operable for transferring of data stored in a telephone device received by the computerized mobile telephone dispenser from the customer to the preselected mobile telephone dispensed by the mobile telephone dispenser to the customer. Additionally or alternatively, the computerized mobile telephone dispenser also includes automatic data transfer functionality operable for transferring of data of the customer, the data stored in an internet accessible storage facility, to the preselected mobile telephone dispensed by the mobile telephone dispenser to the customer.

Preferably, the computerized mobile telephone dispenser also includes a user data input device for providing data input to the mobile telephone dispenser.

In accordance with a preferred embodiment of the present invention the customer interface is a computerized web-based customer interface.

There is further provided in accordance with yet another preferred embodiment of the present invention a mobile telephone device service and distribution system including a customer interface allowing a purchasing customer to select a mobile telephone device and a telephone number to be associated with the mobile telephone device and a computerized mobile telephone dispenser operative to dispense a preselected mobile telephone having a customer preselected telephone number to the purchasing customer who earlier selected the mobile telephone device and the telephone number, automatically activate the mobile telephone device to operate with the telephone number selected by the purchasing customer, receive a mobile telephone to be serviced from a service customer, dispense a replacement telephone to the service customer and automatically activate the replacement telephone to operate with a telephone number of the mobile telephone to be serviced.

Preferably, the customer interface is a computerized web-based customer interface.

BRIEF DESCRIPTION OF THE DRAWINGS

The present invention will be understood and appreciated more fully from the following detailed description, taken together with the drawings in which:

FIGS. 1A, 1B and 1C are simplified illustrations of three examples of an initial stage of mobile communicator depot methodology in accordance with a preferred embodiment of the present invention;

FIGS. 2A, 2B and 2C together are a simplified illustration of an automatic acceptance processing of a customer's mobile communicator stage of mobile communicator depot methodology in accordance with a preferred embodiment of the present invention;

FIGS. 3A, 3B, 3C, 3D, 3E, 3F and 3G together are a simplified illustration of a replacement mobile communicator personalization and dispensing stage of mobile communicator depot methodology in accordance with a preferred embodiment of the present invention;

FIGS. 4A, 4B, 4C, 4D, 4E and 4F together are a simplified illustration of a back-end processing stage of mobile communicator depot methodology in accordance with a preferred embodiment of the present invention;

FIGS. 5A and 5B together are a simplified illustration of a replacement mobile communicator return stage of mobile communicator depot methodology in accordance with a preferred embodiment of the present invention;

FIGS. 6A, 6B, 6C and 6D together are a simplified illustration of replacement mobile communicator acceptance, validation and depersonalization functionality and customer's mobile communicator repersonalization and dispensing functionality in accordance with a preferred embodiment of the present invention;

FIGS. 7A and 7B together are a simplified illustration of the operation of an embodiment of a mobile telephone device distribution system constructed and operative in accordance with a preferred embodiment of the present invention.

DETAILED DESCRIPTION OF PREFERRED EMBODIMENTS

Figure 1A:
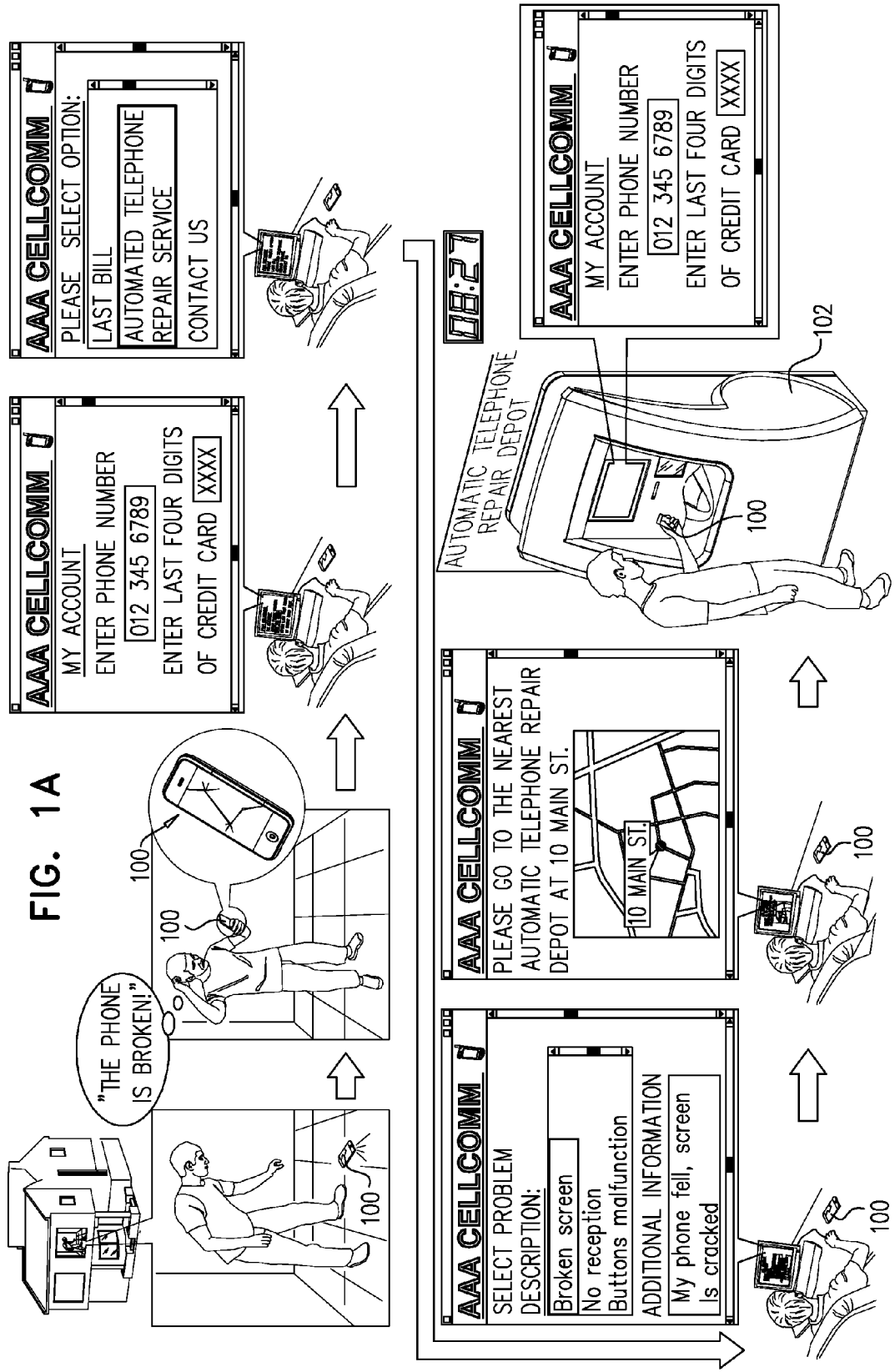
Figure 1B:
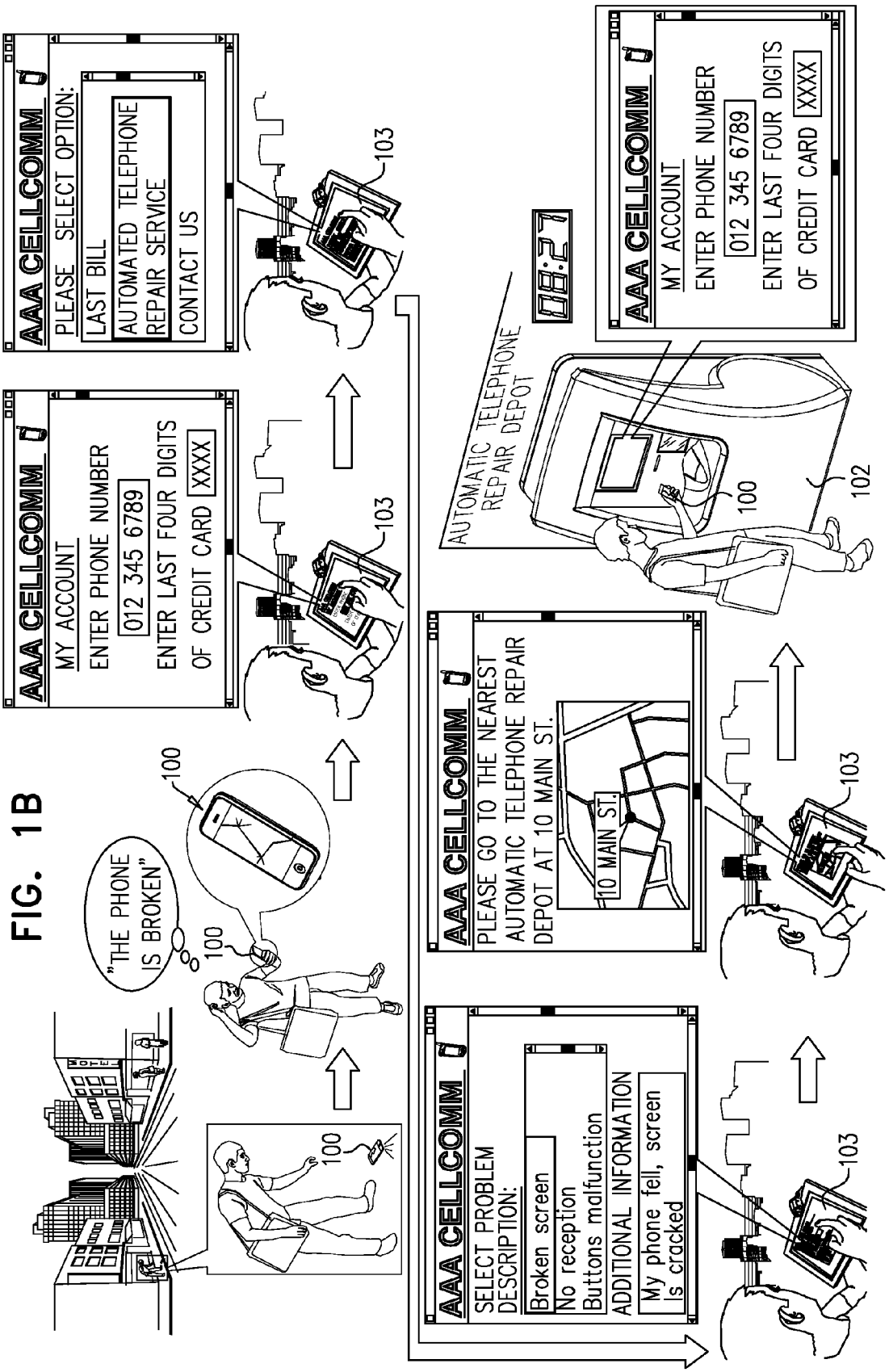

Reference is now made to FIGS. 1A, 1B and 1C, which are simplified illustrations of three examples of an initial stage of mobile communicator depot methodology in accordance with a preferred embodiment of the present invention. Turning to FIG. 1A, there is shown a scenario wherein a customer, whose mobile communicator 100, here a smartphone, is broken, initiates a repair over the internet such as by using his home computer to access the customer service website of cellular telephone service provider.

Typically the customer identifies himself to the customer service website by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator 100 by entering his mobile communicator telephone number and a unique identifier, such as the last four digits of his credit card.

Turning to FIG. 1B, there is shown an alternative scenario wherein a customer, whose mobile communicator 100, here a smartphone, is broken, initiates a repair over the internet such as by using another mobile communicator 103, such as an iPAD to access the customer service website of cellular telephone service provider.

Typically the customer identifies himself by entering his mobile communicator telephone number and a unique identifier, such as the last four digits of his credit card. The customer may then select the Automated Telephone Repair Service and is then prompted to describe the problem with his mobile communicator 100, such as a broken screen. It is appreciated that once the customer enters the telephone number of mobile communicator 100, the system already has information regarding the identity, type and functionality of mobile communicator 100.

The customer is preferably directed to the nearest repair depot 102 and may be shown its location on a map.

Upon arrival at the repair depot 102, the customer is prompted to identify himself and his mobile communicator by entering his mobile communicator telephone number and a unique identifier, such as the last four digits of his credit card.

Turning to FIG. 1C, there is shown a scenario wherein a customer, whose mobile communicator 100, here a smartphone, is broken, is unable to initiate a repair over the internet, since he does not have access to the internet. In such a case, the customer may go directly to a repair depot 102.

Typically the repair depot 102 interacts directly with the customer and prompts the customer to identify himself by entering his mobile communicator telephone number and a unique identifier, such as the last four digits of his credit card. The customer is then prompted to describe the problem with his mobile communicator, such as a broken screen. It is appreciated that once the customer enters the telephone number of mobile communicator 100, the system already has information regarding the identity, type and functionality of mobile communicator 100.

Figure 2B:
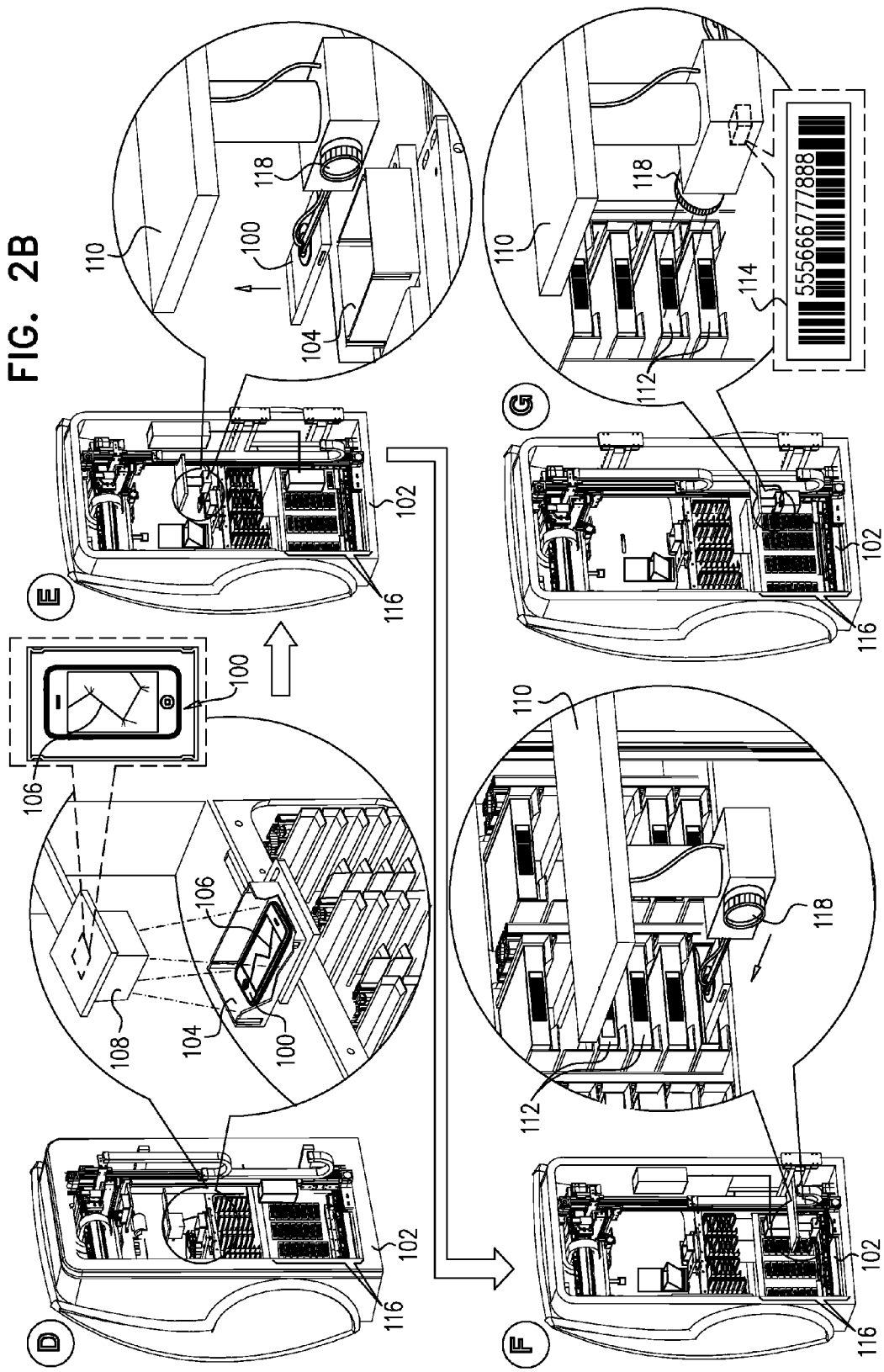

Reference is now made to FIGS. 2A, 2B and 2C, which together are a simplified illustration of an automatic acceptance processing of a customer's mobile communicator stage of mobile communicator depot methodology in accordance with a preferred embodiment of the present invention. As seen in FIG. 2A, upon arrival at depot 102, a customer is prompted to place his mobile communicator 100 in a receiving receptacle 104.

As shown in FIG. 2B, depot 102 preferably includes functionality for confirming that mobile communicator 100 is placed in the receptacle 104 with its screen 106 facing upwards and also includes a camera 108 for photographing the top surface of mobile communicator 100, the top surface including screen 106.

A robotic mechanism 110 is preferably employed for initially repositioning the receptacle 104 containing mobile communicator 100 from its initial position, shown in FIG. 2A, at which the customer placed mobile communicator 100 therein, to a second position, shown in FIG. 2B at which the top surface of mobile communicator 100 is photographed by camera 108, to a third position in which mobile communicator is disposed within one of a multiplicity of bins 112, each of which is preferably identified by a barcode 114 and which are located in a storage and transport structure 116.

A barcode scanner 118 is preferably mounted on robotic mechanism 110 for reading barcode 114 of bin 112 in which the customer's mobile communicator 100 is placed, for recording the identity of bin 112 and for associating it with the identity of customer's mobile communicator 100 in a computerized database.

As shown in FIG. 2C, a virtual repair ticket 120 is preferably generated. Virtual repair ticket 120 preferably includes the customer's mobile communicator telephone number, the bin number of the bin in which mobile communicator 100 is disposed, and a description of the required repair as provided by the customer. The virtual repair ticket 120 is preferably transmitted via the internet to a central server 122, typically located at a site remote from depot 102, which site may house a repair center.

The customer receives an acknowledgement of receipt of the deposited mobile communicator 102, preferably in the form of an audio-visual message which is backed up by a virtual email message and preferably is prompted to select a preferred pick up location, which need not be the same depot 102. Upon receipt of a user pick up location selection input, the depot 102 preferably provides an acknowledgement, preferably in the form of an audio-visual message which is backed up by a virtual email message.

Reference is now made to FIGS. 3A, 3B, 3C, 3D, 3E, 3F and 3G, which together are a simplified illustration of a replacement mobile communicator personalization and dispensing stage of mobile communicator depot methodology in accordance with a preferred embodiment of the present invention. As shown in FIGS. 3A-3G, it is a particular feature of the present invention that, upon request by the customer, a replacement mobile communicator is automatically provided to the customer by the depot.

As shown in particular in FIG. 3A, depot 102 offers the customer a replacement mobile communicator to be used while his broken mobile communicator is being repaired. As further shown in FIG. 3B, upon accepting the offer, the customer is then asked by depot 102 whether he would prefer that his contact list be transferred to the replacement mobile communicator.

Thereafter, as shown in FIG. 3C, depot 102 selects a replacement communicator bin 130 which is located in a replacement communicator storage and transport structure 132 and which contains a replacement mobile communicator, and preferably employs barcode scanner 118 which is preferably mounted on robotic mechanism 110 to read the barcode 136 of bin 130.

As further shown in FIG. 3C, a virtual mobile communicator activation instruction 140 is preferably generated by depot 102, which instruction 140 preferably includes the customer's mobile communicator telephone number and the bin number of bin 130 retrieved from barcode 136. Instruction 140 is preferably transmitted via the internet to a central server 122, typically located at a site remote from depot 102, which site may house a service center. It is appreciated that server 122 stores information for associating bin numbers of bins in replacement communicator storage and transport structure 132 with identifiers of mobile communicators stored therewithin. Therefore, server 122 may utilize the information in instruction 140 to associate the customer's mobile communicator telephone number with the identifier of the replacement mobile communicator located in bin 130, and to store this information for ascertaining, upon return of repaired mobile communicator 100 to the customer, that the replacement mobile communicator dispensed to the customer is indeed returned.

Responsive to instruction 140, server 122 preferably activates the replacement mobile communicator located in bin 130 in association with the customer's mobile communicator telephone number.

As yet further shown in FIG. 3C, depot 102 then generates a virtual contact list synchronization instruction 150, which instruction 150 preferably includes the customer's/mobile communicator's identifier and the bin number of bin 130 retrieved from barcode 136. Instruction 150 is preferably transmitted via the internet to central server 122 and instructs server 122 to download the customer's contact list to depot 102. It is appreciated that contact lists stored on mobile communicators are typically also stored on the internet on various backup facilities, such as, for example, on a central backup server of the cellular telephone service provider, and therefore may be accessible to server 122.

As yet further shown in FIG. 3C, upon receiving virtual contact list synchronization instruction 150, server 122 preferably transmits the customer's contact list 160 to depot 102 where it is temporarily stored.

Turning now to FIG. 3D, it is shown that robotic mechanism 110 is preferably employed for retrieving replacement mobile communicator 162 from bin 130. Preferably, after replacement mobile communicator 162 is retrieved, depot 102 loads contact list 160 onto mobile communicator 162 preferably by wirelessly communicating therewith. It is appreciated that communication between depot 102 and replacement mobile communicator 162 may alternatively be wired.

Figure 3E:
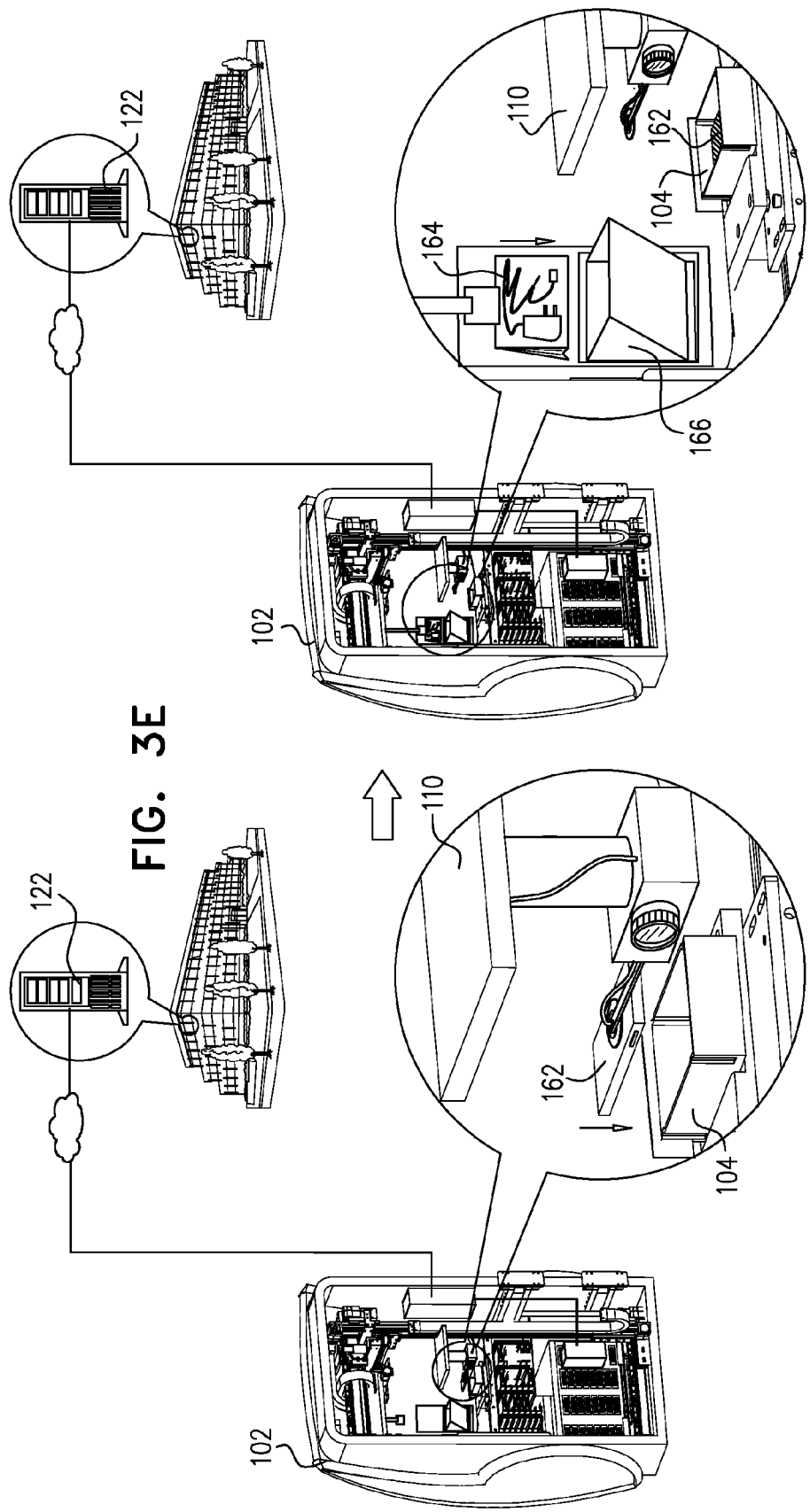
Figure 3G:
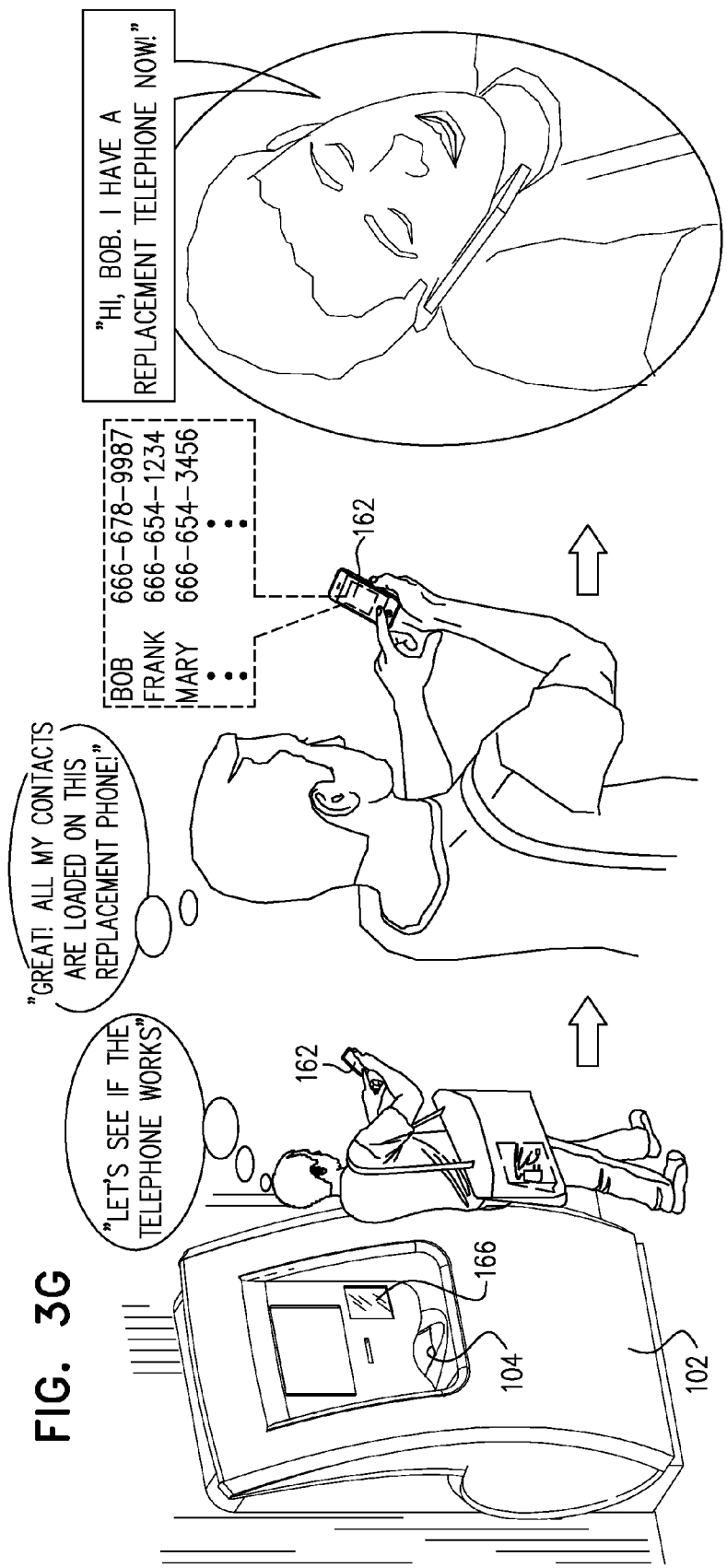

Thereafter, as shown in FIG. 3E, robotic mechanism 110 preferably places replacement mobile communicator 162 into receptacle 104, and also preferably places a compatible mobile communicator accessory kit 164 into a dispenser bin 166. It is appreciated that mobile communicator accessory kit 164 may include, for example, a mobile communicator charger and data synchronizing cables.

Turning now to FIG. 3F, is shown that depot 102 thereafter notifies the customer that a replacement mobile communicator having his contact list loaded thereupon has been prepared for him, and prompts the customer to remove replacement mobile communicator 162 and mobile communicator accessory kit 164 from receptacle 104 and bin 166, respectively. As further shown in FIG. 3G, after retrieving replacement mobile communicator 162 and mobile communicator accessory kit 164, the customer ascertains that replacement mobile communicator 162 is loaded with his contact list, and that replacement mobile communicator 162 is fully functional.

Figure 4A:
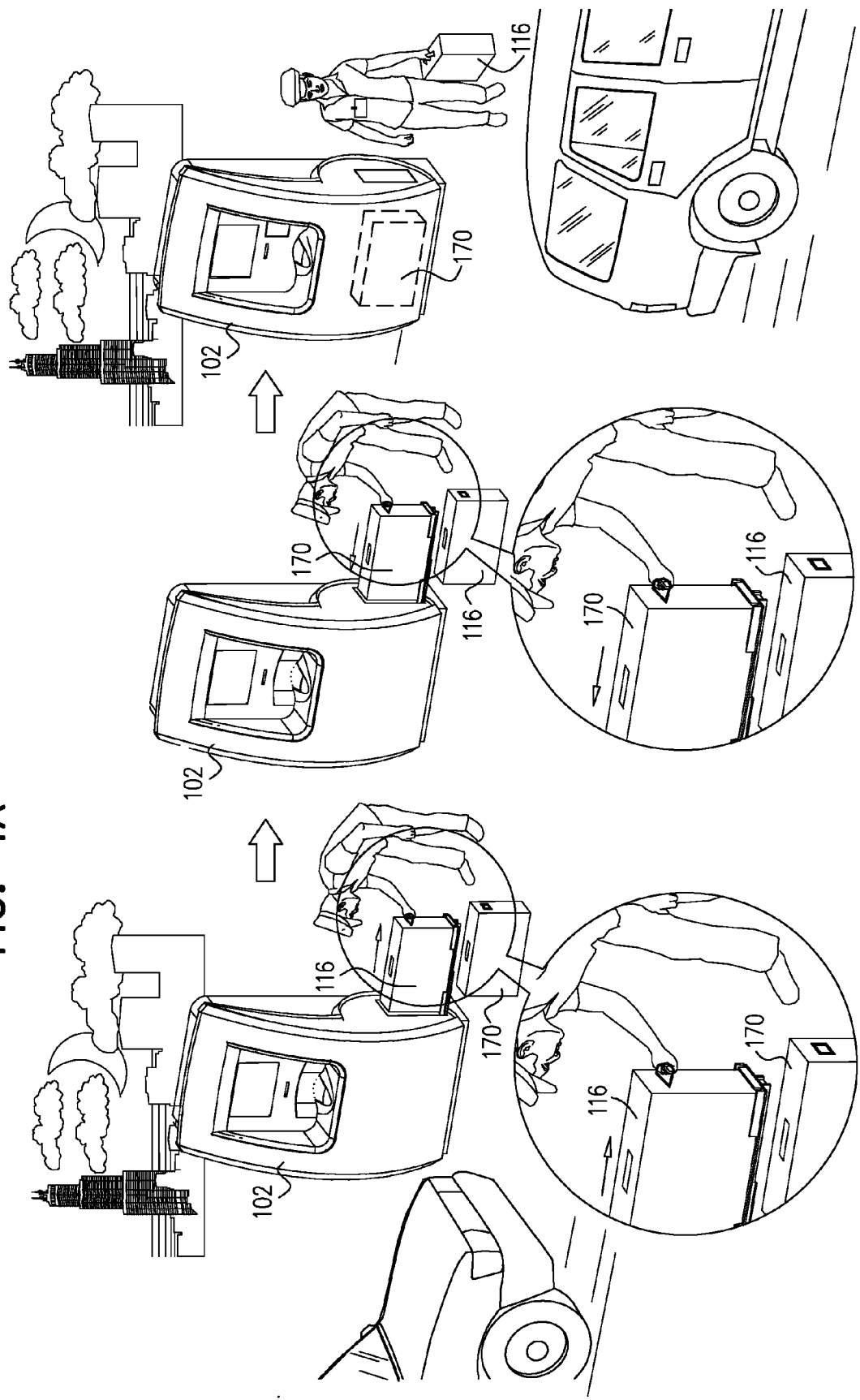

Reference is now made to FIGS. 4A, 4B, 4C, 4D, 4E and 4F, which together are a simplified illustration of a back-end processing stage of mobile communicator depot methodology in accordance with a preferred embodiment of the present invention. As shown in FIG. 4A, a mobile communicator depot service employee arrives at depot 102 and removes storage and transport structure 116 from depot 102. As described hereinabove with regard to FIG. 2A, storage and transport structure 116 preferably comprises bins 112, each of bins 112 preferably containing a mobile communicator destined for repair.

As further shown in FIG. 4A, after removing storage and transport structure 116 from depot 102, the depot service employee inserts an alternative storage and transport structure 170 into depot 102, transport structure 170 preferably having repaired mobile communicators disposed in bins therewithin. The method by which mobile communicators are repaired and disposed within transport structure 170 will be described in greater detail hereinbelow with regard to FIGS. 4B-4E.

As yet further shown in FIG. 4A, after inserting alternative storage and transport structure 170 into depot 102, the depot service employee removes storage and transport structure 116 from the premises and, as shown in FIG. 4B, delivers storage and transport structure 116 to a mobile communicator service center.

Turning now to FIG. 4B, it is shown that a mobile communicator service center employee receives storage and transport structure 116 from the depot service employee and preferably scans the barcode of each of bins 112 which contains a broken mobile communicator into a computer 172. It is appreciated that computer 172 preferably communicates with server 122 and is operative to retrieve information associated with broken mobile communicator 100 which was submitted to server 122 via a virtual repair ticket, such as virtual repair ticket 120 of FIG. 2C. As described hereinabove with regard to FIG. 2C, this information may include, for example, a bin identification number of the bin 112 containing broken mobile communicator 100, a mobile communicator customer identifier such as a telephone number, and a description of the required repair. The information also preferably includes an identifier of the particular depot at which mobile communicator was deposited and an identifier of the preferred pickup location of the repaired mobile communicator as, for example, specified by the customer in the illustration of FIG. 2C.

As yet further shown in FIG. 4B, after retrieving the information of virtual repair ticket 120 from computer 172, the service center employee retrieves mobile communicator 100 from its bin 112 and repairs mobile communicator 100.

It is appreciated that while being repaired, the contact list stored in mobile communicator 100 may be partially or completely deleted. The contact list may have also been partially or completely deleted upon breakage of mobile communicator 100. Therefore, as shown in FIG. 4C, the service center employee preferably utilizes computer 172 to access server 122 to download the customer's contact list 160 to computer 172 in preparation for reactivation of mobile communicator 100. As described hereinabove with regard to the illustration of FIG. 3C, it is appreciated that mobile communicator contact lists are typically also stored on the internet on various backup facilities, such as, for example, on a central backup server of the cellular telephone service provider, and therefore may be accessible to server 122.

As further shown in FIG. 4C, the service center employee preferably loads contact list 160 onto mobile communicator 100 by wirelessly transmitting contact list 160 from computer 172 to mobile communicator 100. Alternatively, transmission of the contact list from computer 172 to mobile communicator 100 may be wired.

Figure 4D:
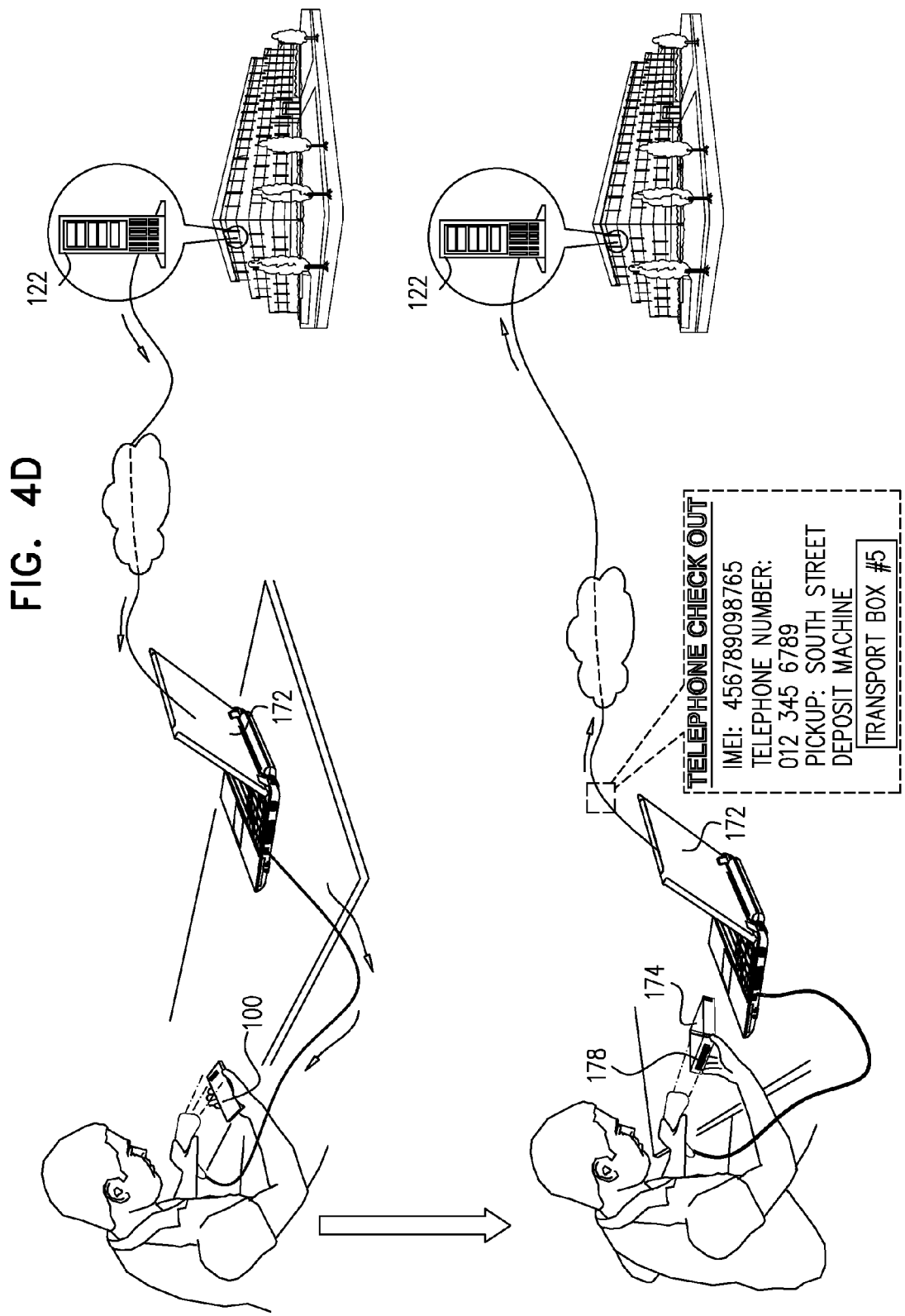

Turning now to FIG. 4D, it is shown that after completing the repair of mobile communicator 100 and loading contact list 160 onto repaired mobile communicator 100, the service center employee then preferably utilizes computer 172 to generate a virtual delivery ticket 176 for repaired mobile communicator 100, which ticket 176 preferably includes a physical identifier of communicator 100, such as an IMEI identifier. It is appreciated that the physical identifier may be retrieved from communicator 100, for example, by scanning a barcode embedded in communicator 100 or by manually querying communicator 100 via its user interface.

Preferably, the service center employee also scans a barcode identifier 178 of bin 174 into computer 172 and adds identifier 178 to ticket 176. The service center employee then preferably utilizes computer 172 to communicate with server 122, where the identifier of communicator 100 as provided in ticket 176 is used to identify communicator 100 as that of the customer of FIGS. 1A-3G. Server 122 is also preferably operative to associate the customer's identifier, such as his telephone number, and the preferred pickup location as originally specified by the customer, with ticket 176.

Figure 4E:
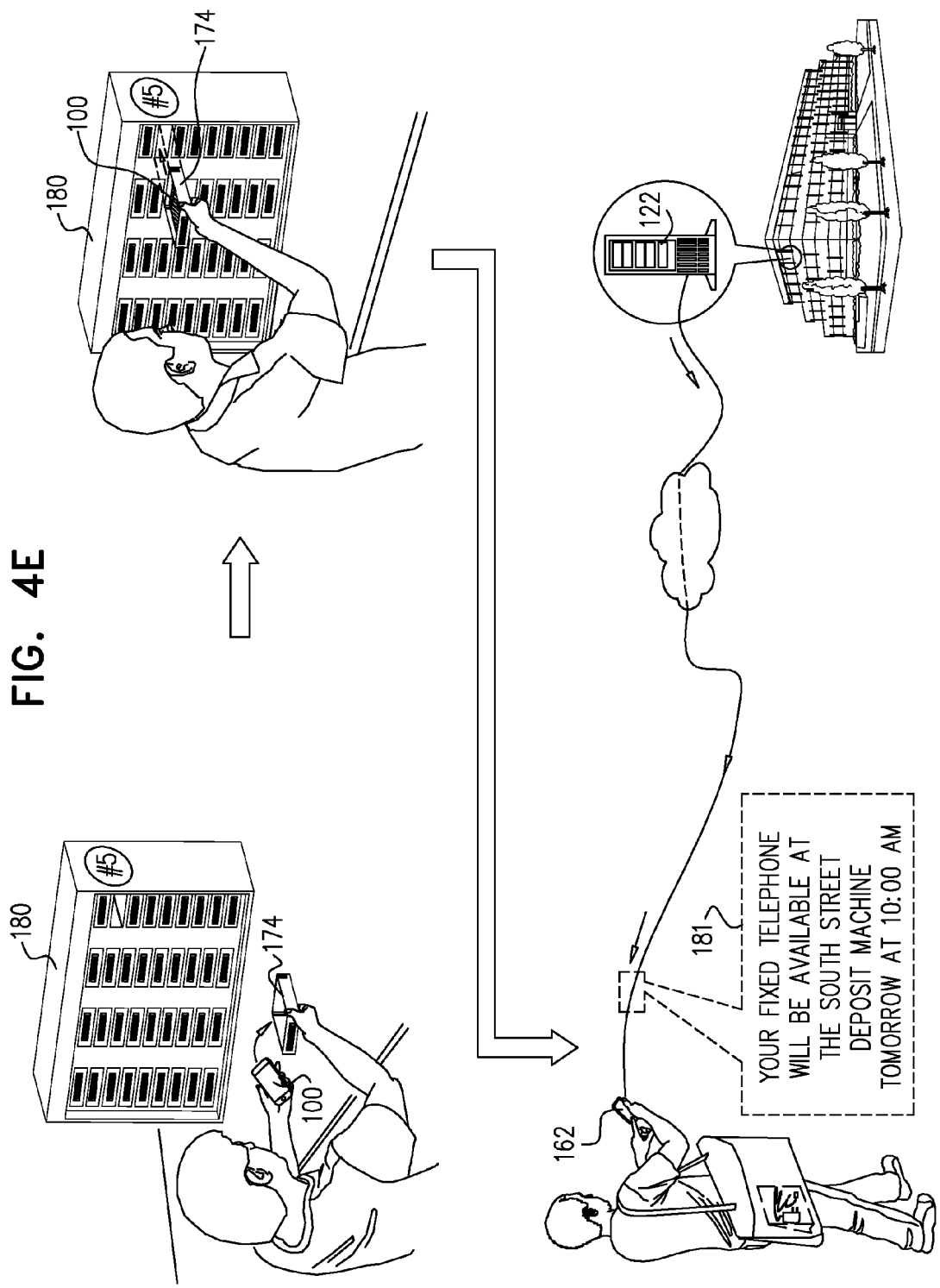

It is appreciated that server 122 is also preferably operative to provide the service center employee with an identifier of a storage and transport structure 180 which is destined for delivery to the customer's preferred pickup location. Upon verifying that the details of ticket 176 are correct, the service center employee preferably submits the completed ticket 176 to server 122. As shown in FIG. 4E, the service center employee then places repaired mobile communicator into bin 174 and inserts bin 174 into storage and transport structure 180 which is destined for delivery to the customer's preferred pickup location.

As further shown in FIG. 4E, server 122 then preferably sends a message 181 to the customer, notifying the customer that his mobile communicator has been repaired and will be available at the pickup location he originally specified on the following day at or after a particular time, such as 10:00 AM. It is appreciated that message 181 may be, for example, an email message or an SMS message sent to the customer's replacement mobile communicator 162.

Turning now to FIG. 4F, it is shown that a communicator depot service employee arrives at the mobile communicator service center on the following day at 6:00 AM, and retrieves storage and transport structure 180 for transport to a mobile communicator depot 182 located at the customer's preferred pickup location.

As further shown in FIG. 4F, upon arriving at depot 182, the communicator depot service employee preferably removes a storage and transport structure 184 from within depot 182 for transport to mobile communicator service center. Thereafter, the communicator depot service employee inserts storage and transport structure 180 into depot 182, storage and transport structure 180 having repaired mobile communicators disposed therewithin. As yet further shown in FIG. 4F, upon insertion of storage and transport structure 180 into depot 182, depot 182 preferably sends a message to server 122, notifying server 122 that storage and transport structure 180 having repaired mobile communicators disposed therewithin has been inserted into depot 182.

Reference is now made to FIGS. 5A and 5B, which together are a simplified illustration of a replacement mobile communicator return stage of mobile communicator depot methodology in accordance with a preferred embodiment of the present invention. As shown in FIG. 5A, after storage and transport structure 180 containing repaired mobile communicator 100 has been deposited in depot 182, such as at 8:00 AM, the customer preferably receives a message from server 122 that his repaired mobile communicator 100 is now available at his preferred pickup location. It is appreciated that the message may be, for example, an email message or an SMS message sent to the customer's replacement mobile communicator 162.

Thereafter, such as at 10:00 AM, the customer arrives at depot 182 and identifies himself to depot 182 by entering his mobile communicator telephone number and a unique identifier, such as the last four digits of his credit card. The customer is then prompted to select a service option, and proceeds to select the Retrieve Repaired Telephone service.

Thereafter, as shown in FIG. 5B, the customer is prompted by depot 182 to return replacement mobile communicator 162 and accessory kit 164. The customer then preferably proceeds to place replacement mobile communicator 162 into receiving receptacle 104 and accessory kit 164 into bin 166. Depot 182 then preferably notifies the customer that the returned equipment is being processed.

Reference is now made to FIGS. 6A, 6B, 6C and 6D, which together are a simplified illustration of replacement mobile communicator acceptance, validation and depersonalization functionality and customer's mobile communicator repersonalization and dispensing functionality in accordance with a preferred embodiment of the present invention.

As shown in FIG. 6A, depot 182 preferably includes functionality for confirming that replacement mobile communicator 162 is placed in receptacle 104 with its screen 106 facing upwards, and also includes a camera 108 for photographing the top surface of mobile communicator 162. It is appreciated that photographing of replacement mobile communicator 162 by camera 108 is operative to ascertain that mobile communicator 162 is not significantly damaged.

Robotic mechanism 110 is preferably employed for initially repositioning the receptacle 104 containing replacement mobile communicator 162 from its initial position, shown in FIG. 5B, at which the customer placed replacement mobile communicator 162 therein, to a second position, shown in FIG. 6A at which the top surface of replacement mobile communicator 162 is photographed by camera 108. Preferably, the replacement mobile communicator 162 is verified by depot 182 to be identical to the replacement mobile communicator originally dispensed to the customer in the illustrations of FIGS. 3A-3G, for example by scanning the IMEI identifier of replacement mobile communicator 162 and comparing the scanned IMEI identifier to the IMEI identifier of the replacement mobile communicator originally dispensed to the customer, as stored on server 122.

Robotic mechanism 110 then preferably removes replacement mobile communicator 162 from receptacle 104 and disposes replacement mobile communicator 162 into one of bins 186 located in a replacement communicator storage and transport structure 188. Each of bins 186 is preferably identified by a barcode 190. Barcode scanner 118 which is preferably mounted on robotic mechanism 110 is preferably employed for reading the barcode of bin 186 in which replacement mobile communicator 162 is disposed, for recording the identity of the bin 186 and for associating the identity of bin 186 with the identifier of replacement mobile communicator 162 in a computerized database.

Figure 6B:
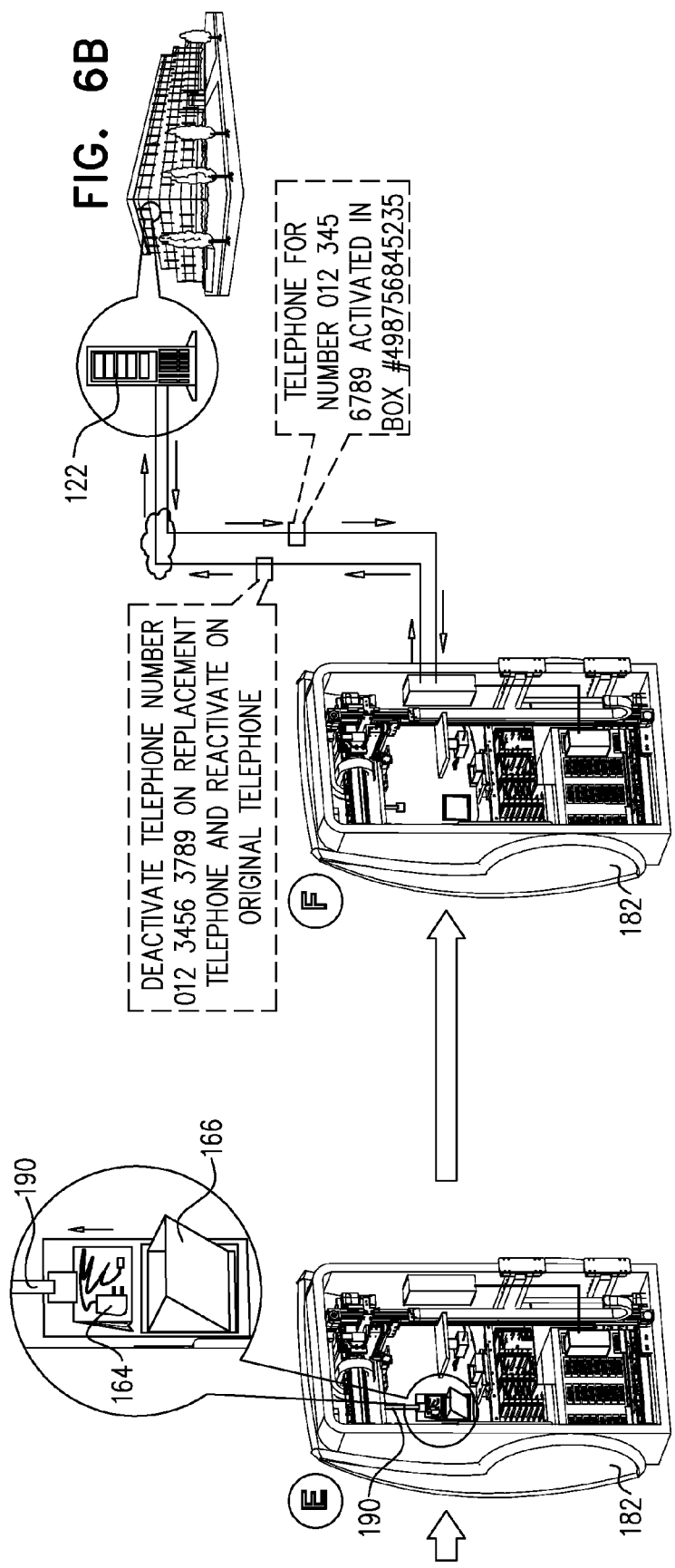

Thereafter, as shown in FIG. 6B, accessory kit 164 is preferably retrieved from bin 166 by a second robotic arm 190. Upon completing the retrieval of replacement mobile communicator 162 and accessory kit 164 from receptacle 104 and bin 166, depot 182 preferably communicates with server 122 and requests deactivation of replacement mobile communicator 162 and reactivation of mobile communicator 100 in association with the customer's mobile communicator telephone number. It is appreciated that, as described hereinabove with reference to FIG. 4D, the customer's mobile communicator telephone number is associated by server 122 with mobile communicator 100 and is therefore sufficient to uniquely identify mobile communicator 100.

As yet further shown in FIG. 6B, responsive to the communication from depot 182, server 122 deactivates replacement mobile communicator 162 and activates mobile communicator 100 in association with the customer's mobile communicator telephone number. Preferably, server 122 also provides the identifier of the specific bin 174 in storage and transport structure 180 which contains repaired mobile communicator 100. It is appreciated that upon deactivation of replacement mobile communicator 162, depot 182 may ascertain whether the customer has stored new data on replacement mobile communicator 162 during the period of time in which he was in possession of replacement mobile communicator 162, and may transfer the new data to mobile communicator 100 upon activation of mobile communicator 100.

Thereafter, as shown in FIG. 6C, barcode scanner 118, which is preferably mounted on robotic mechanism 110, is employed to identify and locate bin 174 by its barcode identifier 178, which identifier 178 was provided by server 122 to 182 as identifying the bin in which repaired mobile communicator 100 is disposed.

Upon locating bin 174, robotic mechanism 110 is preferably employed to retrieve repaired mobile communicator 100 from bin 174 and to deposit repaired mobile communicator 100 into receptacle 104, and to thereafter reposition receptacle 104 to a position which is accessible to the customer. As further shown in FIG. 6C, the customer is then prompted by depot 182 to retrieve his repaired mobile communicator from receptacle 104.

Turning now to FIG. 6D, it is shown that upon retrieving his repaired mobile communicator 100 from receptacle 104, the customer verifies that mobile communicator 100 is in working condition and that his contact list is present on communicator 100.

Reference is now made to FIGS. 7A and 7B, which together illustrate operation of an embodiment of a mobile telephone device distribution system constructed and operative in accordance with a preferred embodiment of the present invention.

As seen in FIG. 7A, a user typically enters the website of a telephone supplier, which sells mobile telephones for use with multiple service providers, and is prompted at an appropriate stage, typically in response to a selection of a specific model that he wishes to purchase, to indicate whether he wishes to trade in his current telephone. If he answers YES, he is asked whether he wishes to keep his current telephone number. If he chooses to retain his current telephone number, he is asked to enter his current telephone number. If he chooses not to trade in his current telephone or chooses not to retain his current telephone number, he is presented with a menu allowing him to select a telephone number.

In accordance with a preferred embodiment of the present invention, the user is also asked whether he wishes to retain his current cellphone carrier. If he chooses to retain his current cellphone carrier, he is asked to enter his current cellphone carrier. If he chooses not to retain his current cellphone carrier, he is presented with a menu allowing him to select a cellphone carrier.

Further in accordance with a preferred embodiment of the present invention, the user is also asked whether he wishes to transfer his telephone accessible information, such as his contact list, pictures and mobile applications, to his new telephone. If he answers YES, he may be prompted to enter a password.

The user is then presented with a screen inviting him to pick up the new telephone at one or more selectable depot locations and is given a transaction code 200 for the pick up.

As seen in FIG. 7B, when the user arrives at the depot 202, he enters the transaction code 200 and, if he has selected to trade in his current telephone, is invited to place his current telephone on a tray 204. In accordance with the selections made by the user, the system dispenses a new telephone to the user, which, preferably, already has his selected telephone number and telephone accessible information and is ready for use with his selected service provider.

It is appreciated that in an alternative embodiment of the present invention, the system may be telephone manufacturer specific and/or service provider specific. In such a case, the choices available to the user as to the type of telephone and/or the identity of the service provider will be narrower.

It is appreciated that depot 202 preferably includes functionality for confirming that a telephone device has been placed in tray 204 and may also include a camera for photographing the telephone device.

Figure 8A:
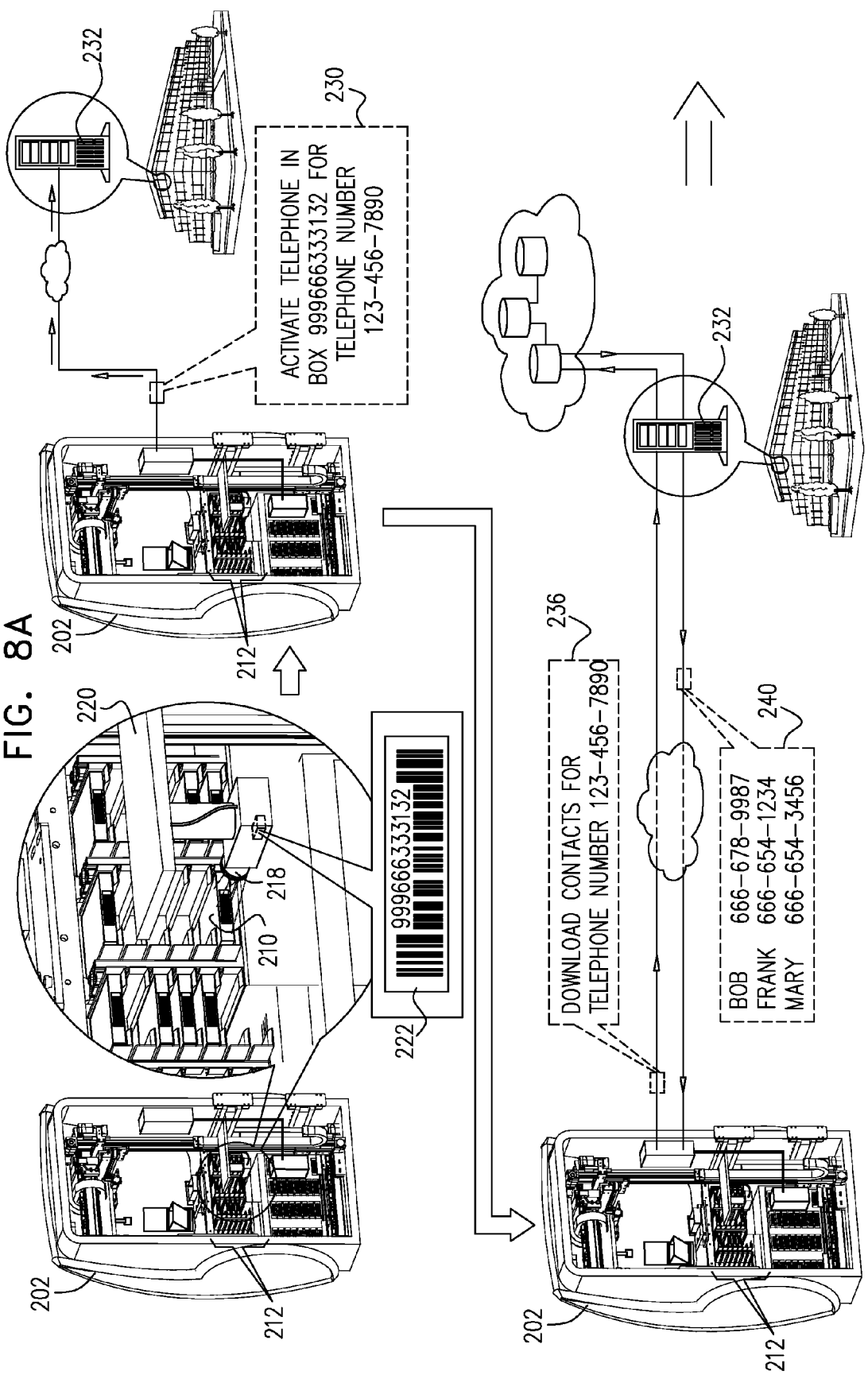
FIGS. 8A and 8B together are a simplified illustration of mobile telephone device personalization and dispensing functionality of the mobile telephone device distribution system of FIGS. 7A and 7B.
Figure 8B:
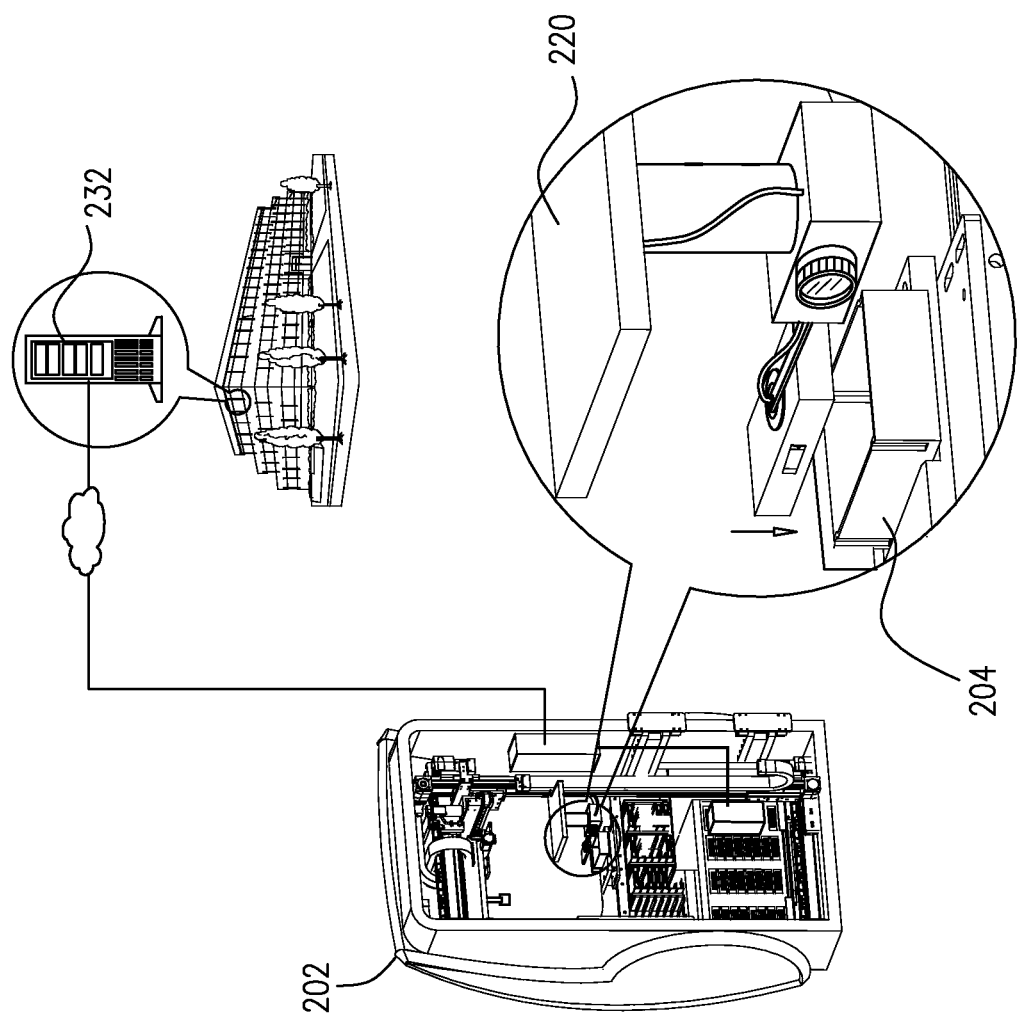

Reference is now made to FIGS. 8A and 8B, which together are a simplified illustration of mobile telephone device personalization and dispensing functionality of the mobile telephone device distribution system of FIGS. 7A and 7B.

As shown in FIG. 8A, depot 202 selects a communicator bin 210 which is located in a telephone device storage and transport structure 212 and which contains a telephone device, and preferably employs a barcode scanner 218 which is preferably mounted on a robotic mechanism 220 to read a barcode 222 of bin 210.

As further shown in FIG. 8A, a virtual mobile communicator activation instruction 230 is preferably generated by depot 202, which instruction 230 preferably includes the mobile communicator telephone number selected by the user, which may be the user's current telephone number, and the bin number of bin 210 retrieved from barcode 222. Instruction 230 is preferably transmitted via the internet to a central server 232, typically located at a site remote from depot 202, which site may house a sales and/or service center. It is appreciated that server 232 stores information for associating bin numbers of bins in telephone device storage and transport structure 212 with identifiers of mobile communicators stored therewithin. Therefore, server 232 preferably utilizes the information in instruction 230 to activate the mobile communicator located in bin 210 in association with the mobile communicator telephone number selected by the user.

As noted above with reference to FIG. 7A, if the customer wishes to trade in his current telephone, he is asked if he wishes to transfer his telephone accessible information, such as his contact list, pictures and mobile applications, to his new telephone.

As yet further shown in FIG. 8A, if the user has selected to transfer his telephone accessible information, depot 202 may then generate an information transfer instruction 236, which instruction 236 preferably includes the customer's/mobile communicator's identifier and the bin number of bin 210 retrieved from barcode 222. Instruction 236 is preferably transmitted via the internet to central server 232 and instructs server 232 to download the telephone accessible information, such as his contact list 240, pictures and mobile applications, to depot 202, from where it can be loaded onto the telephone device in bin 210. It is appreciated that the telephone accessible information stored on mobile communicators is typically also stored on the internet on various backup facilities, such as, for example, on a central backup server of the cellular telephone service provider or on the cloud, and therefore may be accessible to server 232.

Alternatively, depot 202 may include information transfer functionality to directly transfer the telephone accessible information from the telephone device that was traded in to the telephone device in bin 210.

It is appreciated that robotic mechanism 220 is preferably employed for retrieving the telephone device from bin 210. Preferably, after the telephone device is retrieved, depot 202 loads the telephone accessible information, such as contact list 240, onto the telephone device, preferably by communicating therewith via a wireless communication link. It is appreciated that communication between depot 202 and the telephone device may alternatively be via a wired communication link.

Thereafter, as shown in FIG. 8B, robotic mechanism 220 preferably places the telephone device into tray 204.

It is appreciated that the functionality of depot 102, shown in FIGS. 1A-6D and the functionality of depot 202, shown in FIGS. 7B-8B, may be combined into a single depot including both service and distribution functionalities and that the computerized customer interface, which is typically internet based, shown in FIGS. 1A-1B may be combined with the computerized customer interface, which is typically internet based, shown in FIG. 7A. It is further appreciated that the computerized customer interface, which is typically internet based, shown in FIG. 7A, may be incorporated into the depot based user interface shown in FIG. 1C as well as the depot based user interface shown in FIG. 7B.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A mobile telephone device distribution system comprising:
   a customer interface allowing a customer to select:
      a mobile telephone device; and
      a telephone number to be associated with said mobile telephone device; and
   a computerized mobile telephone dispenser operative to:
      dispense a preselected mobile telephone having a customer preselected telephone number to said customer who earlier selected said mobile telephone device and said telephone number; and
      automatically activate said mobile telephone device.

2. A mobile telephone device distribution system according to claim 1 and also comprising a computerized mobile telephone service provider interface providing automated communication with at least one mobile telephone service provider.

3. A mobile telephone device distribution system according to claim 2 and wherein:
   said computerized web-based customer interface also allows said customer to select a mobile telephone service provider; and
   said computerized mobile telephone service provider interface automatically assigns said customer preselected telephone number to said preselected mobile telephone.

4. A mobile telephone device distribution system according to claim 1 and wherein said computerized mobile telephone dispenser also includes:
   automatic data transfer functionality operable for transferring of data stored in a telephone device received by said computerized mobile telephone dispenser from said customer to said preselected mobile telephone dispensed by said mobile telephone dispenser to said customer.

5. A mobile telephone device distribution system according to claim 1 and wherein said computerized mobile telephone dispenser also includes:
  automatic data transfer functionality operable for transferring of data of said customer, said data stored in an internet accessible storage facility, to said preselected mobile telephone dispensed by said mobile telephone dispenser to said customer.

6. A mobile telephone device distribution system according to claim 1 and wherein said computerized mobile telephone dispenser also comprises:
  a user data input device for providing data input to said dispenser.

7. A mobile telephone device distribution system according to claim 1 and wherein said customer interface is a computerized web-based customer interface.

8. A mobile telephone device distribution system comprising:
  a customer interface allowing a customer to select:
    a mobile telephone device;
    a telephone number to be associated with said mobile telephone device; and
    a mobile telephone service provider; and
  a computerized mobile telephone dispenser operative to:
    dispense a preselected mobile telephone having a customer preselected telephone number to a customer who earlier selected said mobile telephone device and said telephone number; and
    automatically activate said mobile telephone device using said customer preselected telephone number and said mobile telephone service provider.

9. A mobile telephone device distribution system according to claim 8 and also comprising a computerized mobile telephone service provider interface providing automated communication with at least one mobile telephone service provider.

10. A mobile telephone device distribution system according to claim 9 and wherein said computerized mobile telephone service provider interface automatically assigns said customer preselected telephone number to said preselected mobile telephone and automatically assigns said customer preselected telephone number and said customer preselected mobile telephone to said mobile telephone service provider.

11. A mobile telephone device distribution system according to claim 8 and wherein said computerized mobile telephone dispenser is operative to wirelessly communicate with said mobile telephone device for automatically activating said mobile telephone device using said customer preselected telephone number and said mobile telephone service provider.

12. A mobile telephone device distribution system according to claim 11 and wherein said mobile telephone device is associated with a Subscriber Identification Module (SIM) which can communicate with a selected one of multiple mobile telephone service providers.

13. A mobile telephone device distribution system according to claim 11 and wherein said mobile telephone device has built in Subscriber Identification Module (SIM) functionality which enables said mobile telephone device to communicate with a selected one of multiple mobile telephone service providers.

14. A mobile telephone device distribution system according to claim 8 and wherein said computerized mobile telephone dispenser also includes:
  automatic data transfer functionality operable for transferring of data stored in a telephone device received by said computerized mobile telephone dispenser from said customer to said preselected mobile telephone dispensed by said mobile telephone dispenser to said customer.

15. A mobile telephone device distribution system according to claim 8 and wherein said computerized mobile telephone dispenser also includes:
  automatic data transfer functionality operable for transferring of data of said customer, said data stored in an internet accessible storage facility, to said preselected mobile telephone dispensed by said mobile telephone dispenser to said customer.

16. A mobile telephone device distribution system according to claim 8, and wherein said computerized mobile telephone dispenser also comprises:
  a user data input device for providing data input to said mobile telephone dispenser.

17. A mobile telephone device distribution system according to claim 8 and wherein said customer interface is a computerized web-based customer interface.

18. A mobile telephone device service and distribution system comprising:
  a customer interface allowing a purchasing customer to select:
    a mobile telephone device; and
    a telephone number to be associated with said mobile telephone device; and
  a computerized mobile telephone dispenser operative to:
    dispense a preselected mobile telephone having a customer preselected telephone number to said purchasing customer who earlier selected said mobile telephone device and said telephone number;
    automatically activate said mobile telephone device to operate with said telephone number selected by said purchasing customer;
    receive a mobile telephone to be serviced from a service customer;
    dispense a replacement telephone to said service customer; and
    automatically activate said replacement telephone to operate with a telephone number of said mobile telephone to be serviced.

19. A mobile telephone device distribution system according to claim 18 and wherein said customer interface is a computerized web-based customer interface.

* * * * *